Figure 1:
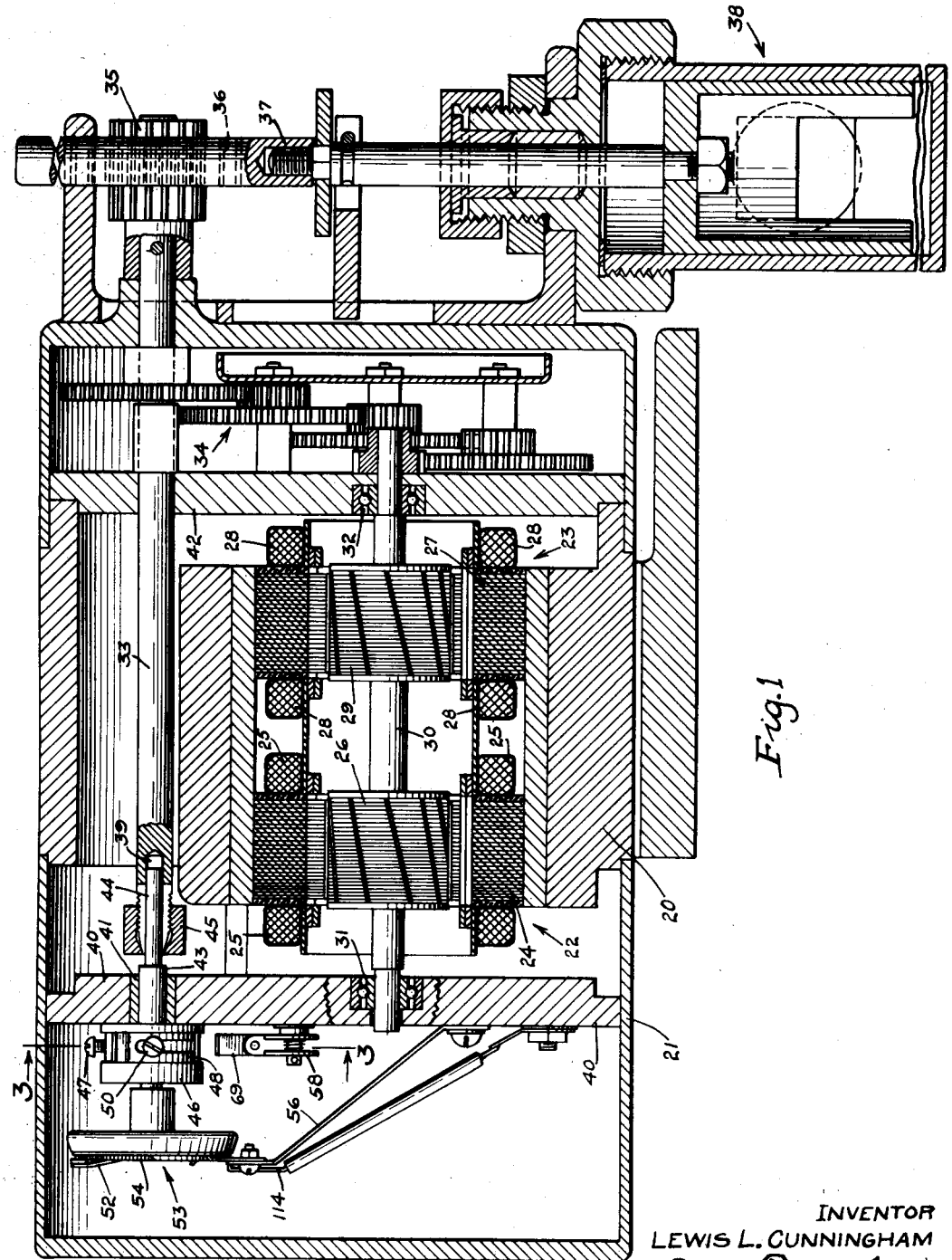

May 30, 1939.　　　L. L. CUNNINGHAM　　　2,160,400
REMOTE CONTROL SYSTEM
Filed May 27, 1933　　　9 Sheets-Sheet 1

INVENTOR
LEWIS L. CUNNINGHAM
By Paul, Paul & Moore
ATTORNEYS

May 30, 1939.　　　L. L. CUNNINGHAM　　　2,160,400
REMOTE CONTROL SYSTEM
Filed May 27, 1933　　　9 Sheets-Sheet 2
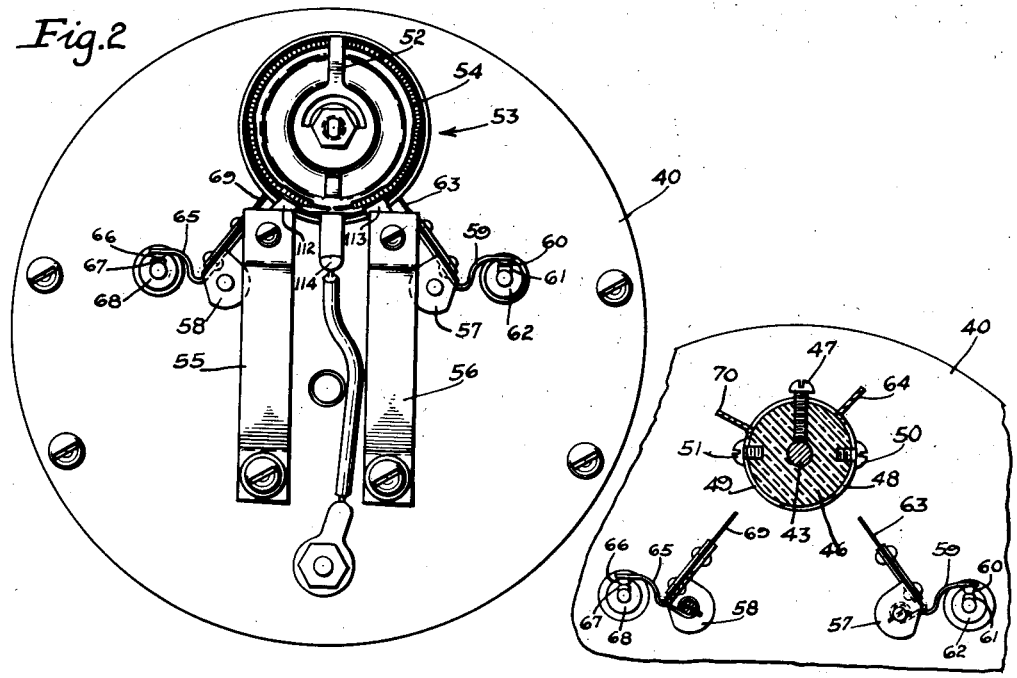
Fig.2
Fig.3
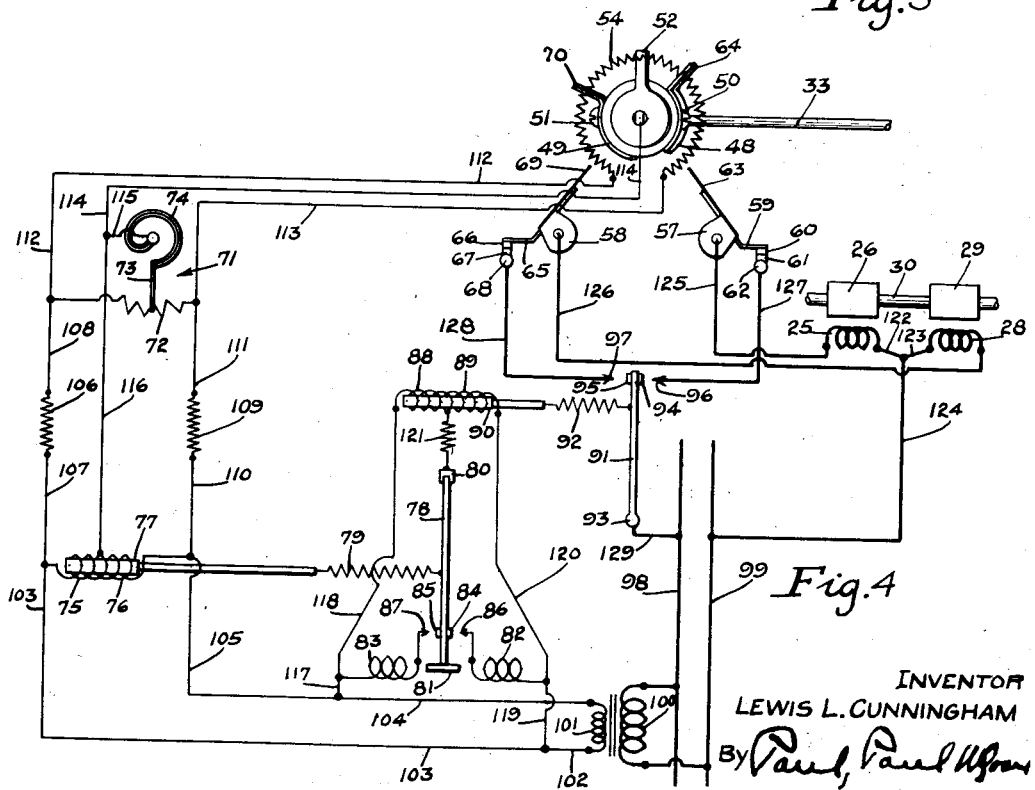
Fig.4
INVENTOR
LEWIS L. CUNNINGHAM
By Paul, Paul & Moore
ATTORNEYS May 30, 1939.  L. L. CUNNINGHAM  2,160,400
REMOTE CONTROL SYSTEM
Filed May 27, 1933  9 Sheets-Sheet 4

INVENTOR
LEWIS L. CUNNINGHAM
BY Paul, Paul & ...
ATTORNEYS

Patented May 30, 1939

2,160,400

UNITED STATES PATENT OFFICE 2,160,400

REMOTE CONTROL SYSTEM

Lewis L. Cunningham, Minneapolis, Minn., assignor to Minneapolis-Honeywell Regulator Company, Minneapolis, Minn., a corporation of Delaware Application May 27, 1933, Serial No. 673,236

14 Claims. (Cl. 236—74)

The present invention relates to an electrical transmission or control system by which the movement of a member which is relatively sensitive or develops a small amount of power may be transmitted to an instrumentality which it is desired to control or move in accordance with the movement of said member.

Systems of this general type have been heretofore proposed in which a movable member moved one of a pair of co-operable electrical contacts toward or away from engagement with the other of the pair of contacts, the contacts, when engaged, completing an electrical circuit to an electrically controlled device which, upon energization, moved the second contact away from the first contact to break the circuit which may have been formerly established by engagement of the contacts and at the same time positioned an instrumentality in accordance with that position of the movable member which resulted in the movement of the first contact toward or away from the second contact.

Such prior art systems are fairly satisfactory for certain classes of work but lack the necessary flexibility to permit their adaptation to all classes of work. For example, the electrically controlled device has been directly mechanically connected to one of the pair of contacts, in order to cause their separation after the instrumentality has been moved to a position corresponding to the position of the movable member. In many instances, the electrically controlled device must be mounted upon a machine or other object which is subject to vibration, and these vibrations are transmitted to the electrically controlled device and in turn to that one of the pair of contacts controlled thereby, thus causing the pair of contacts to chatter whereby the operation of the system is rendered unsatisfactory.

It is a broad purpose of this invention to provide an improved form of electrical system for transmitting the movements of a delicate or sensitive member wherein the controlled device is mechanically remote from the contacts opened and closed by such sensitive member.

More particularly the present invention contemplates the provision of an electrical control system in which a movable member operates a switching mechanism that controls an energizing circuit for an electrically controlled device, the electrically controlled device in turn moving an instrumentality to a position corresponding to the position of the movable member and also operating electrical means which move the switching mechanism to open the energizing circuit for the electrically controlled device when the instrumentality has been so moved. By this arrangement, in which the switching mechanism is operated by the conjoint action of the movable member and the electrical means controlled or operated by the electrically controlled device, the switching mechanism may be placed remotely in respect to the electrically controlled device whereby the switching mechanism is not subject to disturbances, such as vibration, to which the electrically operated device may be subjected.

Again, a feature of the invention resides in the provision of a system of the class described in which one contact of a pair of contacts is moved toward or away from engagement with the other by a movable control member, and in which the contacts when in engagement energize an electrically controlled device that positions a controlled instrumentality in accordance with the movable member, and also operates the first said contact to separate the pair upon such positioning. The electrically controlled device may be a reversible electric motor or a pair of electrical motors which are mechanically interconnected to act as a reversible electric motor. In such a case, the switching mechanism preferably is of the double throw or double circuit type. On the other hand, the electrically controlled device may be a single circuit device, such as a heat motor, in which case the switching mechanism would be of the single throw or single circuit type.

A further object of the invention is the provision of a system of the above-mentioned type in which the electrically controlled device, such as a reversible electric motor or heat motor operates electrical means which in turn move the same contact that is positioned by the movable member to separate it from its cooperating contact.

A more specific object of the invention is the provision of a system embodying normally balanced electrically controlled means which are unbalanced and rebalanced by the conjoint action of a movable control member and an electrically controlled device, the energization of the latter being controlled by a switching mechanism operated by the normally balanced electrically controlled means. The electrically controlled device is thereby positioned in accordance with the position of the movable member and in turn positions any desired instrumentality in accordance with the position thereof.

More specifically, the invention contemplates the provision of normally balanced electrically controlled means which are unbalanced and rebalanced by the conjoint action of control and balancing potentiometers which are electrically associated therewith, the control potentiometer being operated by a movable control member and the balancing potentiometer being operated by an electrically controlled device and the energization of the latter being controlled by a switching mechanism operated by the normally balanced electrically controlled means.

It will be obvious, that the balanced electrically controlled means, such as a center-tapped solenoid, may be placed remotely in respect to either the movable member or the electrically controlled device or both.

Another object of the invention is the provision of means for increasing the contact pressure of one of a pair of contacts against the other in a system of the above-described type. This is preferably accomplished by establishing an auxiliary energizing circuit through a portion of the normally balanced electrically controlled means or center-tapped solenoid as the result of engagement of one of the contacts with the other whereby the contacts will be more firmly engaged until subsequently separated by the action of the electrically controlled device.

Systems of the above-described type are particularly adaptable to the control of heating systems wherein the movable member is positioned by or in accordance with a temperature and/or pressure condition of a heating system and the controlled instrumentality controls the supply of heat either directly or indirectly, as by controlling the supply of fuel to a heater.

Still another object of the invention, therefore, is the application of any of the above described systems to a heating system.

In the practical control of a heating system, for instance, it has sometimes been found that the positioning of a heat control instrumentality in accordance with the temperature and/or pressure condition to be controlled permits of undesirable large fluctuations from normal of the temperature and/or pressure condition if the demand or load on the heating system varies in a substantial amount. Under these conditions it is desirable to primarily position the heat control instrumentality in accordance with the position of a movable member responding to the temperature and/or pressure condition and to also change the position of the heat control instrumentality in accordance with the deviation of the movable member from its normal position and/or in accordance with the length of time that such deviation persists.

An additional object of the invention is the positioning of a control instrumentality primarily in accordance with the position of a movable member and also in accordance with the deviation of that, or another, movable member from its normal desired position and/or in accordance with the length of time that such abnormal deviation persists.

It is also often desirable to additionally change the position of the heat control instrumentality in respect to the position of a movable member upon initial reverse movement of the movable member. In other words, upon initial reverse movement of the movable member, the heat control instrumentality is given an initial movement in a direction to check or counter-act the change which caused such reverse movement of the movable member. This initial change in position of the heat control instrumentality is in addition to the usual movements resulting from any movement of the movable member and may also be in addition to the corrective movements applied as a result of a deviation of the movable member from its desired normal position in accordance with the amount of such deviation and/or in accordance with the length of time such deviation persists.

An additional object of the invention is the positioning of a control instrumentality primarily in accordance with the position of a movable member and also as a result of initial reverse movements of the movable member.

Another object of the invention is the positioning of a control instrumentality primarily in accordance with the position of a movable member and also in accordance with the deviation of that, or another, movable member from its normal desired position and/or in accordance with the length of time that such abnormal deviation persists and, in addition, to adjust the position of the control instrumentality upon initial reverse movement of the movable member.

More specifically, the invention has for an object, the provision of a system in which a normally balanced electrically controlled means is unbalanced by the movement of a movable member from its normal desired position and is additionally unbalanced in proportion to the amount of deviation of the movable member from its normal desired position and/or in accordance with the length of time such deviation persists and/or as a result of initial reverse movement of the movable member. The system is such that the unbalancing of the normally balanced electrically controlled means or balanced solenoid operates a switching mechanism in control of an electrically controlled device which positions a control instrumentality in accordance with the degree of unbalancing of the electrically controlled means and also electrically rebalances said means.

A further object of the invention is the unbalancing of a normally balanced electrically controlled means by the cooperative action of a plurality of movable members, the unbalancing of the electrically controlled means in turn operating an electrically controlled device which positions an instrumentality in accordance with the degree to which said electrically controlled means has been unbalanced and also operates electrical means to rebalance said electrically controlled means. This may be accomplished by having a plurality of movable members operate a like number of control potentiometers which are connected in series, parallel, or series parallel with the normally balanced electrically controlled means and/or by having one or more of the movable members control variable resistances connected in circuit with one or more of the control potentiometers and normally balanced electrically controlled means. The electrically controlled device preferably controls a single balancing potentiometer which rebalances the normally balanced electrically controlled means after the same has been unbalanced by the cooperation of the plurality of movable members.

A further object of the invention is the provision in any of the above-mentioned systems, of a control means operated by the electrically controlled device whereby a second electrically controlled device may be controlled by the position of the first electrically controlled device. In this manner a first instrumentality may be positioned in accordance with the movement of one or more movable members and, if desired, by the amount of deviation of the movable members from their desired normal positions, and a second instrumentality may be positioned in accordance with the position of the first instrumentality so as to provide a cascade control of two or more instrumentalities. In carrying out this phase of the invention, the first electrically controlled device preferably operates two potentiometers, one of which serves as a balancing potentiometer and the other of which serves as the control potentiometer for the second electrically operated device which operates its own balancing potentiometer and the second instrumentality.

Again, it is an object of the invention to provide a control system for an electrically heated heating device in which an induction voltage regulator is controlled, or the movable winding thereof is positioned, in accordance with a heater condition whereby the electromotive force impressed upon the electrical heating element or elements of the heating device is varied in accordance with a heater condition.

Another object of the invention is the provision of means whereby the sensitivity of the various systems may be adjusted so that a predetermined amount of movement of a movable member is required before the instrumentality to be controlled is repositioned and/or so that the magnitude of the resulting movement of the instrumentality to be controlled for a given movement of the movable member may be varied.

These and other objects of the invention will become apparent as the description thereof proceeds.

Figure 5:
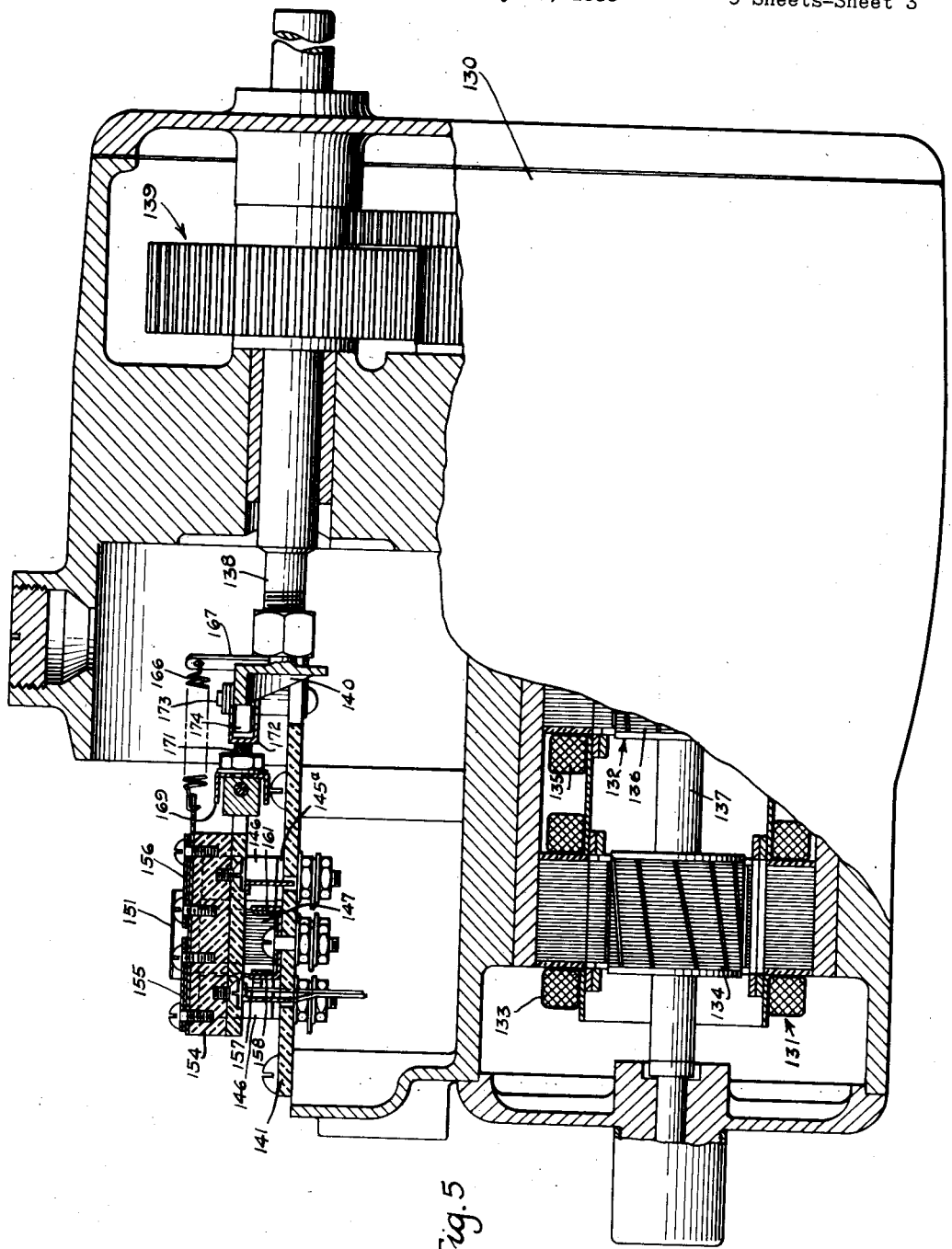
Figure 6:
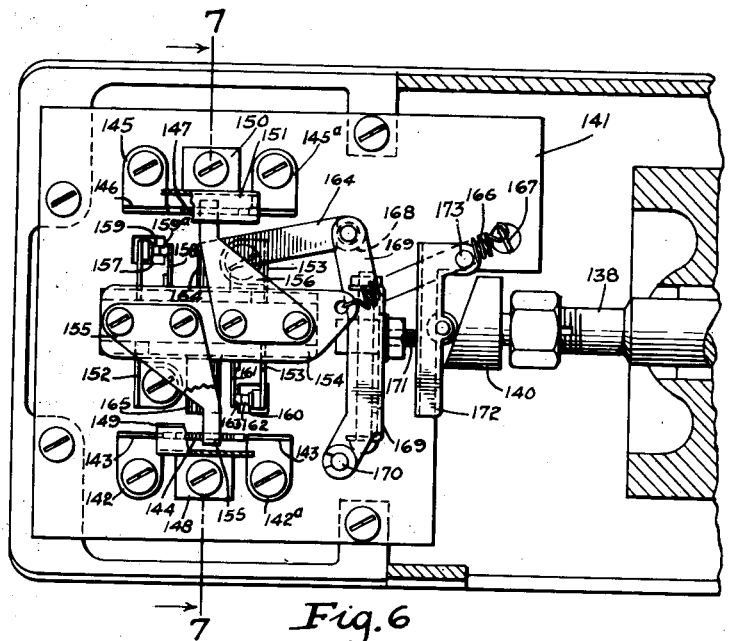
Figure 7:
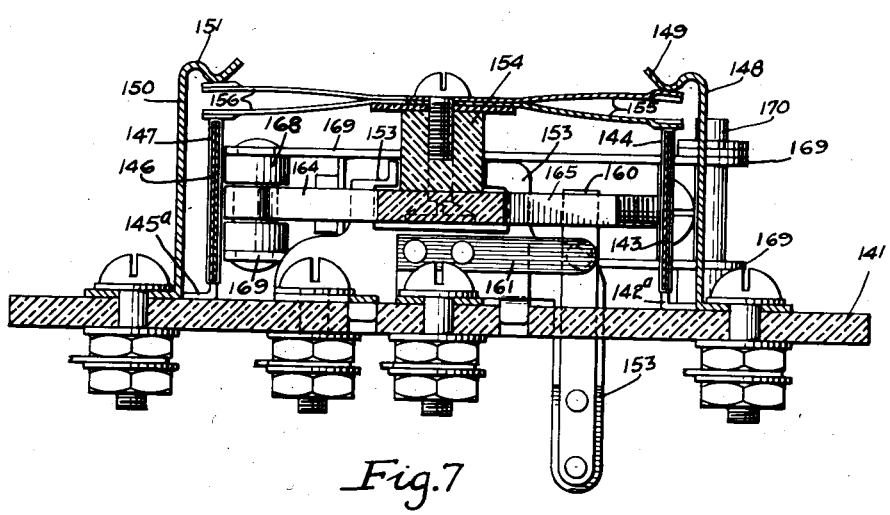
Figure 8:
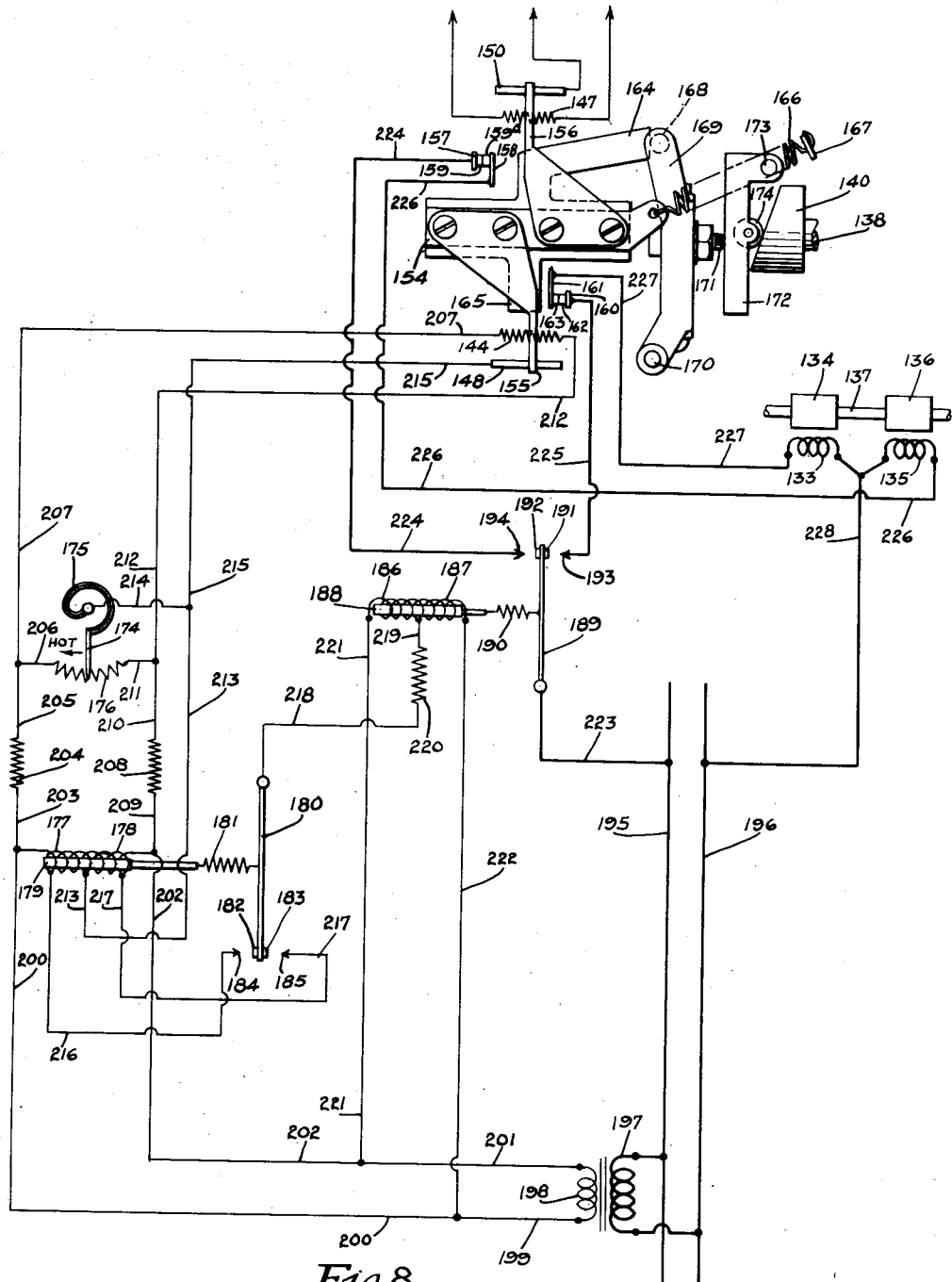
Figure 9:
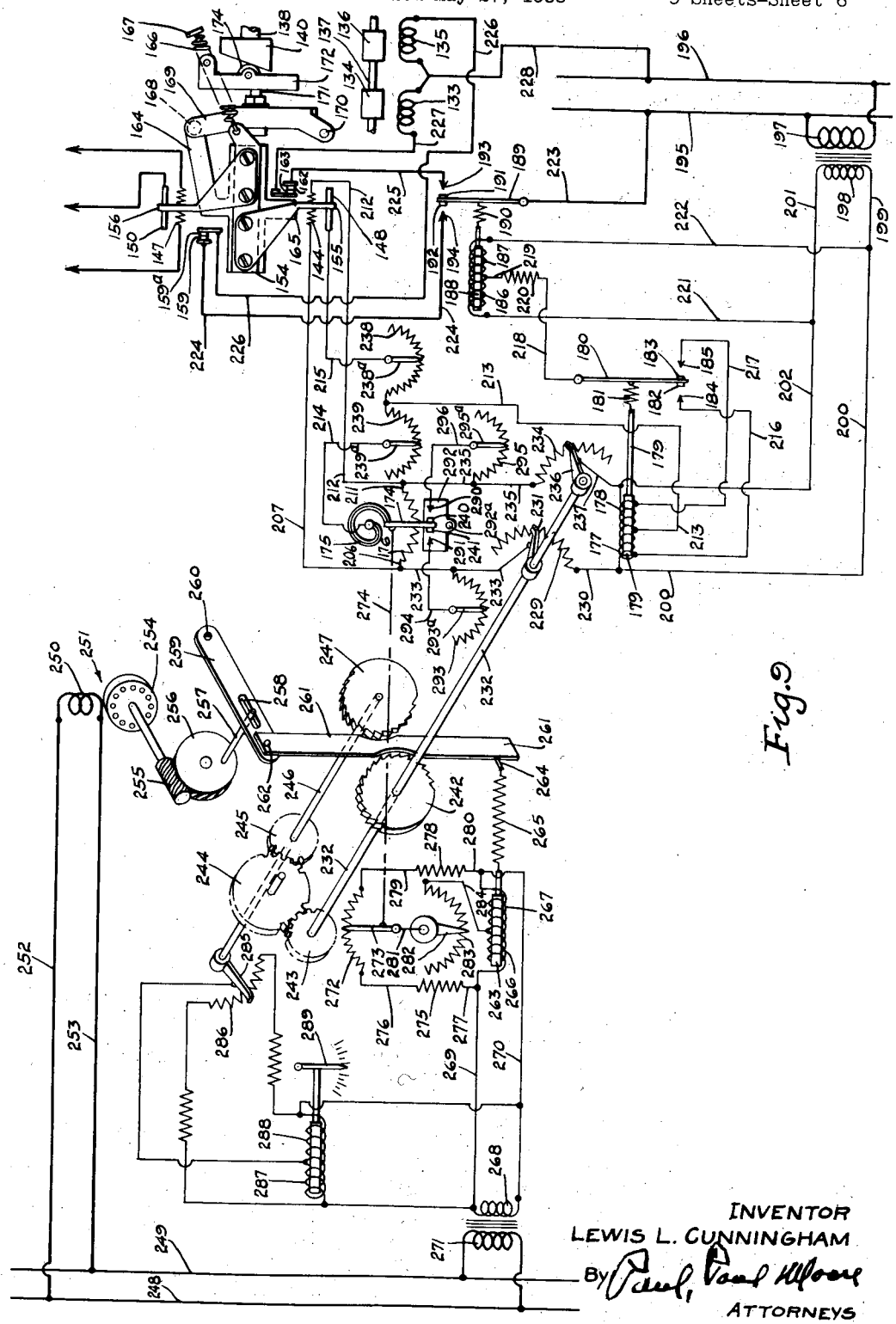
Figure 10:
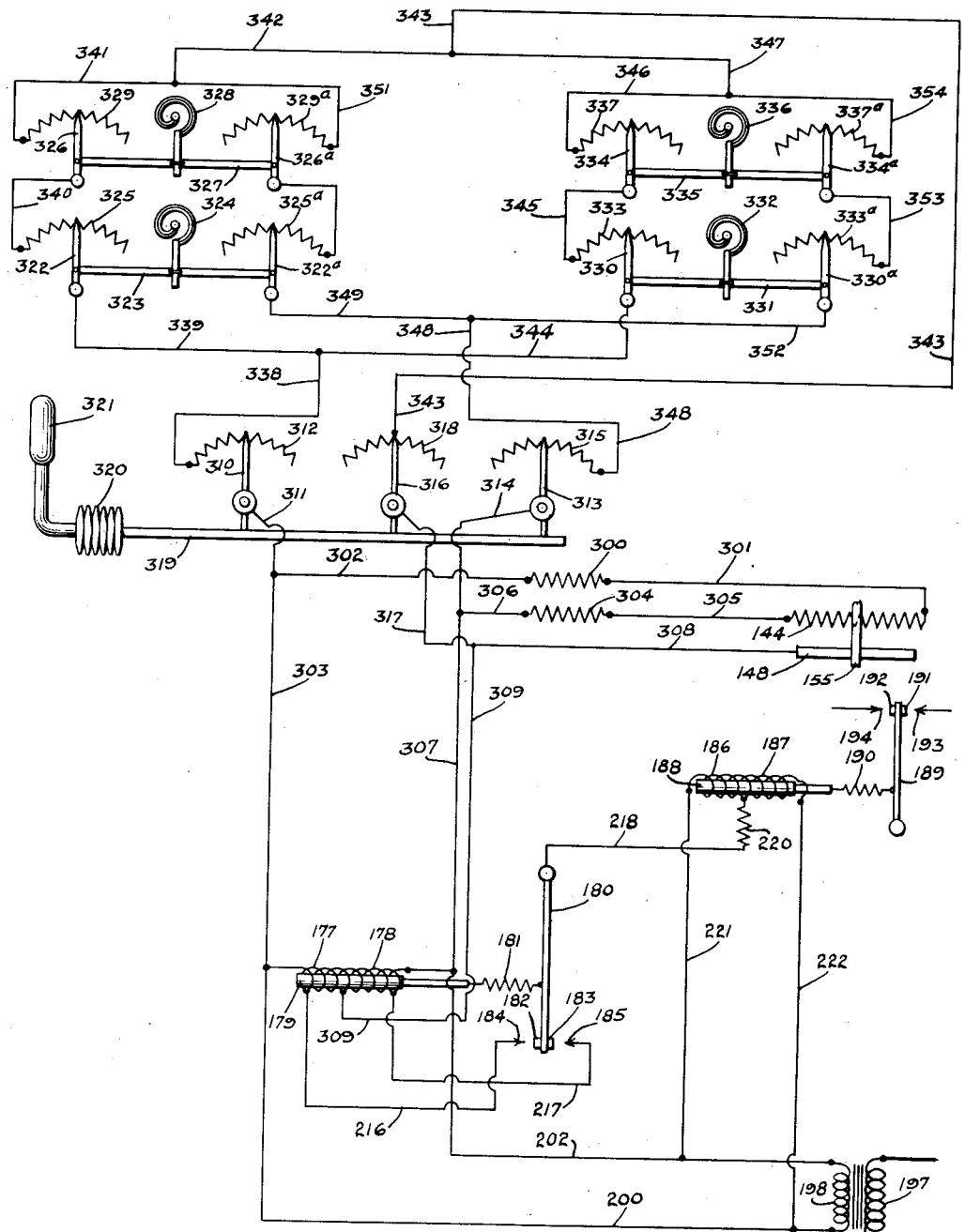
Figure 11:
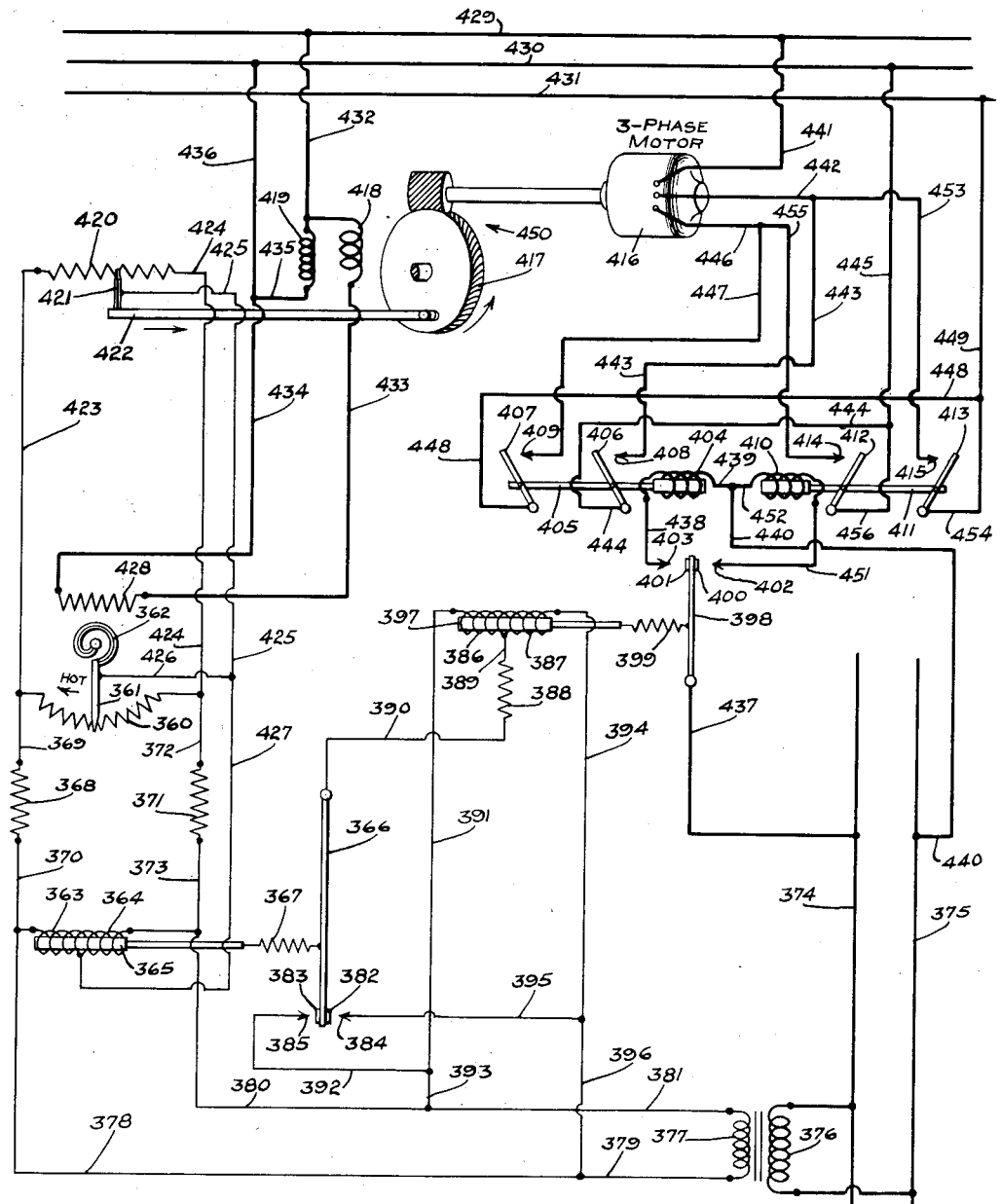
Figure 12:
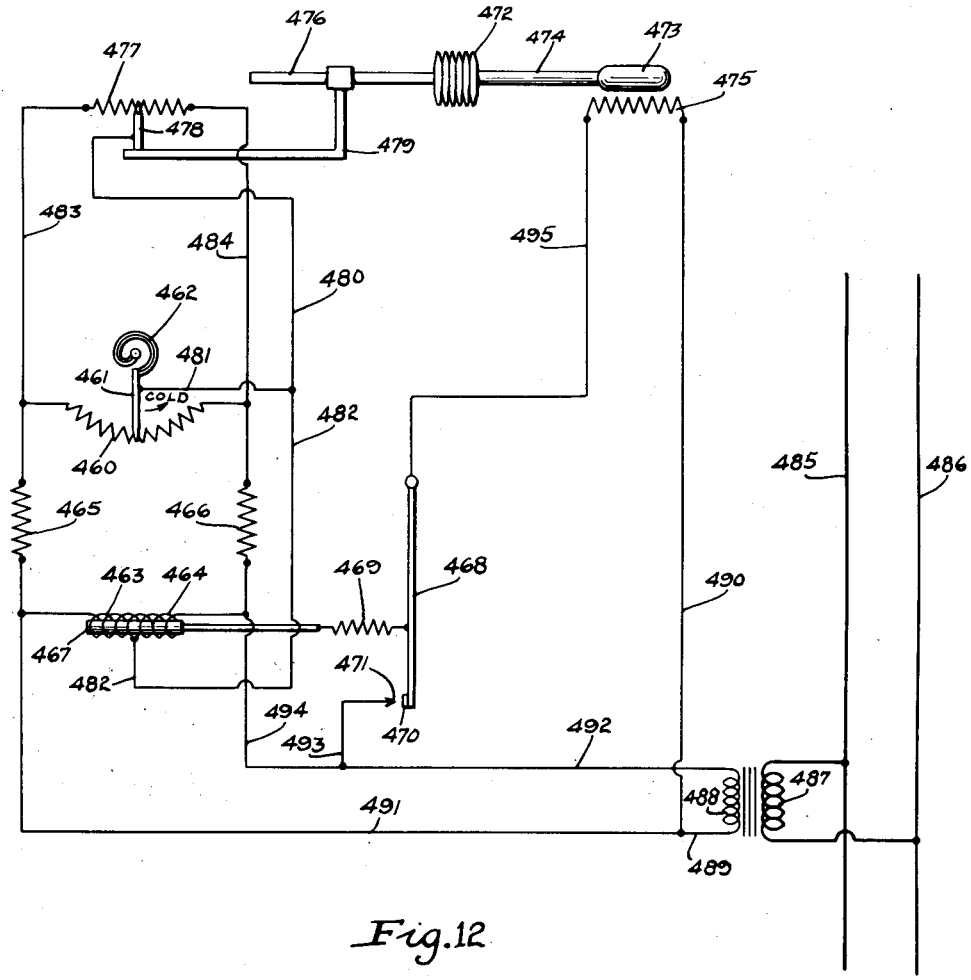

For a more complete understanding of the invention, reference may be had to the following description and accompanying drawings, in which:

Fig. 1 is a longitudinal sectional view of a reversible motor assembly which operates a valve and a balancing potentiometer in accordance with one embodiment of the invention, Fig. 2 is an end view of the apparatus of Fig. 1, looking from the left with the cover removed and omitting the valve structure, Fig. 3 is a partial section taken about on line 3—3 of Fig. 1 and showing the manner in which the limit switches are operated, Fig. 4 is a schematic view showing one complete embodiment of the invention as applied to the apparatus of Fig. 1, Fig. 5 is a side view, with parts in section, of a modified and improved balancing potentiometer and limit switch mechanism, Fig. 6 is a top view of the balancing potentiometer and limit switch mechanism of Fig. 5, Fig. 7 is a sectional view taken about on line 7—7 of Fig. 6, Fig. 8 is a diagrammatic view similar to that of Fig. 4, in which a slightly modified embodiment of the invention is shown applied to the mechanism of Figs. 6, 7, and 8, Fig. 9 is a diagrammatic view similar to that of Fig. 8 to which a load compensating mechanism and other corrective mechanism has been added, Fig. 10 is a diagrammatic view showing a few of the many manners in which the operation of the systems contemplated by the present invention may be modified, Fig. 11 is a diagrammatic view showing the invention controlling an induction voltage regulator which in turn controls the operation of an electric furnace, and Fig. 12 is a diagrammatic view showing the application of the electrical control system of the present invention to a heat motor.

Referring first to Figs. 1, 2, and 3 a cylindrical casing indicated at 20 is provided with a cover 21. Housed within the casing are a pair of squirrel cage induction shaded pole motors generally indicated at 22 and 23. Motor 22 comprises a laminated field core 24, a field winding 25 and a squirrel cage rotor 26. Likewise, motor 23 comprises a laminated field core 27, a field winding 28 and squirrel cage rotor 29. Both rotors 26 and 29 are mounted on and secured to a common shaft 30 journalled in bearings 31 and 32. The motors 22 and 23 are so arranged that their rotors rotate shaft 30 in opposite directions upon energization of their respective field windings 25 and 28 whereby the two motors 22 and 23, taken together, operate as a single reversible motor. Shaft 30 is mechanically connected to a second shaft 33 by means of a reduction gear train generally indicated at 34 whereby the rotation of shaft 30 is transmitted to shaft 33 at a greatly reduced speed and with a correspondingly greater torque.

The right hand end of shaft 33 extends beyond casing 20 and carries a pinion 35 at its extremity. Pinion 35 meshes with teeth 36 formed in a valve stem 37 which operates a valve generally indicated at 38. The left hand end of shaft 33 terminates within casing 20 and is provided with an internal longitudinal bore shown at 39. A fiber circular end plate 40 supported by casing 20 journals bearing 31 and a bushing 41 while a similar end plate 42 journals bearing 32. Bushing 41 journals a short stud shaft 43, the reduced inner end 44 of which is received by the bore 39 of shaft 33 and the end of shaft 33 is connected to stud shaft 43 by a nut 45 which presses the split end of shaft 33 against the periphery of the reduced end 44 of stud shaft 43.

A fiber cylinder 46 is journaled on and secured to stud shaft 43 by means of a screw 47. A pair of limit switch actuators 48 and 49 are adjustably secured to fiber cylinder 46 by means of screws 50 and 51. The outer end of stud shaft 43 is secured to the movable arm 52 of a balancing potentiometer generally indicated 53 and which includes a stationary coiled resistance 54 over which the movable arm 52 is adapted to sweep. The ends of resistance 54 are secured to straps 55 and 56 which in turn are bolted to fiber end plate 40. A pair of limit switches include pivoted bell cranks 57 and 58. Arm 59 of bell crank 57 carries a contact 60 which is normally in engagement with a stationary contact 61 carried by a post 62 mounted on fiber end plate 40 and arm 63 of bell crank 57 extends into the path of movement of the extended end 64 of limit switch actuator 48. Likewise, arm 65 of bell crank 58 carries a contact 66 which is normally in engagement with a contact 67 carried by a post 68 secured to fiber end plate 40 and arm 69 of bell crank 58 extends into the path of movement of the extended end 70 of limit switch actuator 49.

It will be evident that the motion of stud shaft 43 is transmitted to movable arm 52 and limit switch actuators 58 and 57.

Now referring specifically to Fig. 4 of the drawings, a control potentiometer 71 comprises a control resistance 72 and a movable member 73 which is herein shown as operated by a bimetallic element 74. It should be distinctly understood that the use of a bimetallic element in this embodiment of the invention is only illustrative of one of the many ways in which movable member 73 may be controlled. Movable member 73 may respond to any physical condition or may be moved by any desired force or in any other desired manner. Normally balanced electrical means are herein shown as a balanced solenoid which comprises a single center-tapped solenoid or which may be considered as two equal solenoid windings 75 and 76. Solenoid windings 75 and 76 control a plunger 77 which is connected to a flexible switch arm 78 by a light coiled spring 79. One end of flexible switch arm 78 is secured as shown at 80. The other end thereof carries a small armature 81 which cooperates with magnet windings 82 and 83. A pair of movable contacts 84 and 85 are also carried by flexible switch arm 78 and cooperate with stationary contacts 86 and 87 respectively. Contacts 86 and 87 are respectively connected to one end each of magnet windings 82 and 83.

A relay comprises relay windings 88 and 89 which control a plunger 90 that is connected to a flexible relay switch arm 91 by a light coil spring 92. Relay switch arm 91 is secured at one end as shown at 93 and its free end carries movable contacts 94 and 95 which cooperate with stationary contacts 96 and 97.

High voltage line wires 98 and 99 supply electrical power to the system of Fig. 4 which includes a step-down transformer having a high voltage primary 100 connected to line wires 98 and 99. The low voltage secondary is shown at 101. Wires 102 and 103 connect one side of secondary 101 with solenoid winding 75 and wires 104 and 105 connect the other side of secondary 101 with solenoid winding 76. Solenoid winding 75 is connected to one end of control resistance 72 through a protective resistance 106 by wires 107 and 108 and solenoid winding 76 is connected to the other end of control resistance 72 through a protective resistance 109 by means of wires 110 and 111. One end of balancing resistance 54 is connected to one end of control resistance 72 by a wire 112 and the other ends of the balancing and control resistances are connected by a wire 113. Wires 114, 115, and 116 interconnect balancing arm 52, movable member 73 and the junction of solenoid windings 75 and 76.

One side of secondary 101 is connected to magnet winding 83 and relay winding 88 by wires 104, 117, and 118. The other side of secondary 101 is connected to magnet winding 82 and relay winding 89 by wires 102, 119, and 120. The junction of relay windings 88 and 89 is connected to flexible switch arm 78 through a protective resistance 121.

One end of each of the motor field windings 25 and 28 is connected to line 99 by wires 122, 123, and 124. The other end of field winding 25 is connected to contact 60 by a wire 125 and the other end of field winding 28 is connected to contact 66 by a wire 126. Contacts 61 and 96 are connected together by a wire 127 and contacts 67 and 97 are connected together by a wire 128. Relay switch arm 91 is connected to line wire 98 by a wire 129.

*Operation of the system of Fig. 4*

With the parts in the position of Fig. 4, wherein the movable arm 52 is contacting the center of balancing resistance 54 and the movable member 73 is contacting the center of control resistance 72, the voltage drops across solenoid windings 75 and 76 are equal and both of these solenoid windings are equally energized by the secondary 101. Plunger 77 is therefore maintained in a middle or center position wherein flexible switch arm 78 is in a normal unflexed position and movable contacts 84 and 85 are out of engagement with stationary contacts 86 and 87 respectively. Relay windings 88 and 89 are therefore equally energized by the following circuit: secondary 101, wire 102, wire 119, wire 120, relay windings 89 and 88, wire 118, wire 117, and wire 104 back to secondary 101. Relay plunger 90 is therefore maintained in a middle or center position whereby relay switch arm 91 assumes its center unflexed position wherein contacts 94 and 95 are out of engagement with their respective stationary contacts 96 and 97. Field windings 25 and 28 are therefore both de-energized and the valve 38 is, for example, in a mid-position. It will be assumed for the purpose of this explanation that valve 38 controls the flow of a heating medium to a heating device or the flow of fuel to a burner to maintain a desired temperature in a space to which bimetallic element 74 responds. As long as this temperature remains at the desired point, bimetallic element 74 will maintain movable member 73 in contact with the center of control resistance 72 and all of the parts will remain in the position shown in Fig. 4.

Now, if the temperature should rise slightly, bimetallic element 74 will move movable member 73 to the left along control resistance 72 to a point corresponding to the new temperature condition to which bimetallic element 74 is responding. This movement of movable member 73 to the left along control resistance 72 changes the resistance in shunt with solenoid windings 75 and 76 in such a manner that the voltage drop across solenoid winding 75 is reduced and the voltage drop across solenoid winding 76 is increased. Solenoid winding 76 is now energized more than solenoid winding 75 whereupon plunger 77 moves to the right and moves flexible switch arm 78 in the same direction causing movable contact 84 to engage stationary contact 86. A series circuit including magnet winding 82 and protective resistance 121 is thereby connected in parallel with relay winding 89 whereby the voltage drop across relay winding 89 is decreased and the voltage drop across relay winding 88 is increased whereupon plunger 90 is moved to the left. Movement of plunger 90 to the left moves relay switch arm 91 to the left bringing movable contact 95 into engagement with stationary contact 97. The current which flows through magnet winding 82 produces a magnetic flux which attracts armature 81 whereby contact 84 is held firmly against contact 86. Engagement of movable contact 95 with stationary contact 97 energizes the field winding 28 of the motor 23 by the following circuit: line 98, wire 129, relay switch arm 91, contacts 95 and 97, wire 128, limit switch contacts 67 and 66, wire 126, field winding 28, wire 123 and wire 124 to line 99. Energization of field winding 28 rotates rotor 29 and therefore shafts 30 and 33 in a clockwise direction as viewed from the left in Fig. 4. Rotation of shaft 33 in this manner begins to close valve 38 and also moves arm 52 toward the right-hand end of resistance 54. This movement of arm 52 slowly changes the resistance in shunt with solenoid windings 75 and 76 until the voltage drops across these solenoids are again substantially equal. When the voltage drops across solenoid windings 75 and 76 have been thus equalized, both of these solenoid windings will be equally energized. Plunger 77 is therefore returned to its middle or central position as shown in Fig. 4, and flexible switch arm 78 is returned to its normal position and disengages movable contact 84 from stationary contact 86. The force required to break contacts 84 and 86 is insufficient to cause the spring 79 to pull contacts 85 and 87 into engagement. Separation of contact 84 from 86 again equalizes the voltage drops across relay windings 88 and 89 so that plunger 90 is returned to its central position and relay switch arm 91 moves contact 95 out of engagement with contact 97 to de-energize field winding 28 of motor 23.

If the temperature to which bimetallic element 74 responds continues to increase, movable member 73 will move further along control resistance 72 toward the left end thereof, and will again unbalance the voltage drops across solenoid windings 75 and 76 as heretofore explained. Field winding 28 will again be energized to operate rotor 29 to move valve 38 to a more nearly closed position and to move arm 52 across balancing resistance 54 to the right until the voltage drops across solenoid windings 75 and 76 are again rebalanced.

If the temperature to which bimetallic element 74 responds should decrease, movable member 73 will move to the right along control resistance 72. This action will increase the voltage drop across solenoid windings 75 and decrease the voltage drop across solenoid winding 76 whereupon plunger 77 will move to the left and bring contact 85 into engagement with contact 87. Engagement of contact 85 with contact 87 establishes a series circuit between magnet winding 83 and protective resistance 121 and places them in parallel with relay winding 88. The voltage drop across relay winding 88 is thereby decreased which results in an increased voltage drop across relay winding 89 whereupon plunger 90 is moved to the right to cause contact 94 to engage contact 96. Engagement of contact 94 with contact 96 establishes an energizing circuit for the field winding 25 of motor 22 as follows: line 98 wire 129, relay switch arm 91, contacts 94 and 96, wire 127, limit switch contacts 61 and 60, wire 125, field winding 25, wire 122, and wire 124 to line 99. Energization of field winding 25 causes rotor 26 to rotate in a counter-clockwise direction as viewed from the left in Fig. 4, which counter-clockwise rotation is imparted to shafts 30 and 33. This counterclockwise rotation of shaft 33 begins to open valve 38 and likewise moves arm 52 across balancing resistance 54, toward the left end thereof. When arm 52 reaches a certain position on balancing resistance 54, the voltage drops across solenoid windings 75 and 76 will be rebalanced. Plunger 77 will therefore return to its middle position and separate contact 85 from contact 87. This action will rebalance the voltage drops across relay windings 88 and 89 and plunger 90 will move to its central position separating contact 94 from contact 96 to de-energize field winding 25.

It will be noted that if movable member 73 should move to the extreme left end of control resistance 72, solenoid winding 75 would be short circuited were it not for protective resistance 106. Solenoid winding 76 would be short circuited if protective resistance 109 were omitted upon movement of movable member 73 to the extreme right-hand end of control resistance 72. In order to rebalance the system under either of these conditions, arm 52 would have to move to the extreme right or left end of control resistance 54 whereupon both solenoid windings 75 and 76 would be short-circuited. This would not only be undesirable from an electrical standpoint, but also might prevent the return of plunger 77 to its normal middle position and render the apparatus inoperable. These are the reasons for including protective resistances 106 and 109. Protective resistance 121 likewise has utility in protecting the maximum current flow in the energizing circuits for relay windings 88 and 89.

From the foregoing description of the operation of Fig. 4, it will be apparent that the shaft 33 assumes a position corresponding to any position of movable member 73. The solenoid windings 75 and 76 may be considered as normally balanced electrical means which are unbalanced whenever a movable member moves to a new position. This unbalancing of the normally balanced electrical means operates an electrically controlled device which in turn rebalances the normally balanced electrical means and positions an instrumentality in accordance with the position of the movable member. It will also be noted that the contacts 86 and 87 remain stationary at all times and that the cooperating contacts 84 and 85 are first moved in one direction to complete a circuit as a result of movement of the movable member 73 and then are moved in the opposite direction to break that circuit after an instrumentality has been positioned in accordance with the position of the movable member.

The limit switch actuators 64 and 70 may be adjustably positioned in order to limit the extreme positions of the shaft 33 and therefore of the arm 52 and valve 38 or other instrumentality which it is desired to control.

Referring now to Figs. 5, 6, 7, and 8, there is shown a somewhat modified embodiment of the invention. A case 130 houses a pair of induction motors 131 and 132. The motor 131 is provided with a field winding 133 and a rotor 134 and the motor 132 is provided with a field winding 135 and a rotor 136. Rotors 134 and 136 are both mounted on and secured to a shaft 137 that is suitably journalled in casing 130. Shaft 137 is connected to a shaft 138 through a reduction gear train 139, the arrangement being such that shaft 137 drives shaft 138 at a reduced speed in the opposite direction of rotation. The right hand end of shaft 138 extends without casing 130 and may be operatively connected to an instrumentality which it is desired to control, such as the valve 38 of Fig. 1. The left hand extremity of shaft 138 carries a cam 140.

Case 130 supports a horizontal mounted sheet of fiber 141. A pair of brackets 142 and 142a, which are suitably secured to fiber sheet 141 near one side thereof, support a rectangular strip 143 upon which a balancing resistance 144 is wound. A pair of similar brackets 145 and 145a support a similar strip 146 near the other side of the fiber sheet 141 and in parallel relation to the strip 143. A cascade control resistance 147 is wound about strip 146. A metal bracket 148 is secured to fiber sheet 141 between brackets 142 and 142a and has a bent-over portion 149 which over-lies strip 143 and a similar metal bracket 150 has a bent-over portion 151 which over-lies strip 146.

A pair of guide brackets 152 and 153 are secured to fiber sheet 141 and lie between strips 143 and 146. These guide brackets guide a longitudinally slideable fiber actuator 154 to which is secured a pair of conducting spring fingers 155, one of which engages balancing resistance 144 and the other of which engages the bent-over portion 149 of bracket 148. A second similar pair of conducting spring fingers 156 similarly engage cascade resistance 147 and the bent-over portion 151 of bracket 150. Balancing resistance 144, bracket 148 and spring fingers 155 constitute a balancing potentiometer and cascade resistance 146, bracket 150 and spring fingers 156 constitute a cascade control potentiometer.

Fiber sheet 141 also supports a pair of contact carrying springs 157 and 158 which carry limit contacts 159 and 159a respectively. A pair of similar contact carrying springs 160 and 161 carry limit switch contacts 162 and 163. Actuator 154 is provided with a limit switch actuator 164 which extends laterally from actuator 154 and then to the right as viewed in Fig. 6. A similar limit switch actuator 165 extends laterally from the other side of actuator 154.

A coiled spring 166 has one end secured to the right hand end of actuator 154 and its other end is secured to fiber sheet 141 as shown at 167. The end of limit switch actuator 164 abuts a roller 168 which is pivoted to one end of an arm 169, the other end of which is pivoted on fiber sheet 141 at 170. Arm 169 is provided with an adjustable screw 171 which engages an actuating arm 172 that is pivoted at 173 and carries a pivoted roller 174 which abuts cam 140. The coiled spring 166 maintains limit switch actuator 164, arm 169, actuating arm 172, and cam 140 in proper abutting relationship, one to another.

When shaft 138 is rotated counter-clockwise, as viewed from the left in Fig. 6, actuator 154 is moved to the left by cam 140 against the action of spring 166 and spring fingers 155 and 156 move along resistances 144 and 147 respectively and the bent-over portions 149 and 151 respectively of brackets 148 and 150. Extreme counter-clockwise movement of shaft 138 will move actuator 154 to the left until limit switch actuator 164 engages contact carrying spring 157 and moves contact 159 out of engagement with contact 159a. When shaft 138 rotates in a clockwise direction, actuator 154 moves to the right under the action of coiled spring 166 and upon reaching an extreme right hand position, limit switch actuator 165 engages contact carrying spring 160 and moves contact 162 out of engagement with contact 163.

From the foregoing description, it will be apparent that the device of Figs. 5, 6, and 7 differs in certain respects from the device of Figs. 1, 2, and 3 and particularly in that the former provides straight line balancing and cascade resistances and potentiometer operation whereas the latter provides no cascade potentiometer and a circular or rotary balancing potentiometer action.

Now referring to Fig. 8, a complete system utilizing the apparatus of Figs. 5, 6, and 7 is shown. This system includes a control potentiometer comprising a movable member 174 which is controlled by a bimetallic element 175 and sweeps across a control resistance 176. The system likewise includes a center-tapped solenoid comprising solenoid windings 177 and 178. Solenoid windings 177 and 178 control a plunger 179 which is connected to a flexible switch arm 180 by a light spring 181. Flexible switch arm 181 carries contacts 182 and 183 which cooperate with stationary contacts 184 and 185. A relay comprises relay windings 186 and 187 which control a plunger 188 that is connected to a flexible relay switch arm 189 by a light spring 190. Relay swich arm 189 carries contacts 191 and 192 which cooperate with stationary contacts 193 and 194.

Line wires 195 and 196 supply power to the system and the primary 197 of a step-down transformer having a secondary 198 is connected to line wires 195 and 196. Wires 199 and 200 connect one side of secondary 198 with the free end of solenoid winding 177 and wires 201 and 202 connect the other side of secondary 198 with the free end of solenoid winding 178. Wire 203 conects wire 200 with one end of a protective resistance 204. Wires 205, 206, and 207 interconnect the other end of protective resistance 204, one end of control resistance 176 and one end of balancing resistance 144. One end of a protective resistance 208 is connected to wire 202 by a wire 209. Wires 210, 211, and 212 interconnect the other end of protective resistance 208, the other end of control resistance 176 and the other end of balancing resistance 144. Wires 213, 214, and 215 interconnect movable member 174, the junction of solenoid windings 177 and 178 and spring fingers 155, the latter by virtue of their sliding contact with bracket 148.

A wire 216 connects contact 184 with a small number of turns of solenoid winding 177 and a wire 217 similarly connects contact 185 with a small number of turns of solenoid winding 178. Wires 218 and 219 connect flexible switch arm 180, a protective resistance 220, and the junction of relay windings 186 and 187 in series. Wire 221 connects the outer end of relay winding 186 with one side of secondary 198 through wire 201 and a wire 222 similarly connects the outer end of relay winding 187 with the other side of secondary 198 through wire 199.

A wire 223 connects line 195 and relay switch arm 189. A wire 224 connects contact 194 to contact 159 and a wire 225 connects contact 193 with contact 162. Contacts 159a and 163 are respectively connected to one side of field windings 135 and 133 by wires 226 and 227 and the other sides of these field windings are connected to line 196 by a wire 228.

Operation of the system of Fig. 8

The operation of the system of Fig. 8 is similar to the operation of the system of Fig. 4 in its broader aspects. With the parts in the position shown in Fig. 8, the movable member 174 is in engagement with the central portion of control resistance 176 and the spring fingers 155 are in engagement with the central portion of balancing resistance 144 and member 148. With the parts in these positions the voltage drop across solenoid winding 177 is equal to the voltage drop across the solenoid winding 178 which results in equal energization of these solenoid windings. Plunger 179 is therefore in a central position wherein flexible switch arm 180 is in its normal unflexed position and contacts 182 and 183 are out of engagement with contacts 184 and 185 respectively. Relay windings 186 and 187 are connected in series across secondary 198 by the following circuit: secondary 198, wire 199, wire 222, relay windings 187, and 186, wire 221, and wire 201 to the other side of secondary 198. This equal energization of relay windings 186 and 187 positions plunger 188 in a central position. Flexible relay switch arm 189 therefore assumes its normal unflexed position in which contacts 191 and 192 are out of engagement with contacts 193 and 194. Field windings 133 and 135 are both de-energized and shafts 137 and 138 are stationary. The position of shaft 138 corresponds to the position of movable member 174.

If the temperature to which bimetallic element 175 responds now rises, movable member 174 will be moved along control resistance 176 toward the left end thereof. Such movement of movable member 174 changes the resistances associated with solenoid windings 177 and 178 in such a manner that the voltage drop across solenoid winding 178 becomes greater than the voltage drop across solenoid winding 177. Solenoid winding 178 is therefore energized to a greater degree than solenoid winding 177 and plunger 179 is moved to the right resulting in engagement of contact 183 with contact 185. Engagement of contact 183 with contact 185 connects protective resistance 220 in series with a small number of turns of solenoid winding 178, and they in turn are connected in parallel with relay winding 186. The results are two-fold. First, the voltage drop across relay winding 187 becomes greater than that across relay winding 186 whereupon plunger 188 moves to the right and causes contact 191 to engage contact 193. Second, the current traversing the small number of turns of solenoid winding 178 exerts an additional force tending to move plunger 179 to the right, whereby contact 183 is held in firm engagement with contact 185.

Engagement of contact 191 with contact 193 establishes an energizing circuit for field winding 133 as follows: line 195, wire 223, relay switch arm 189, contacts 191 and 193, wire 225, limit contacts 162 and 163, wire 227, field winding 133, and wire 228 to line 196. Energization of field winding 133 rotates rotor 134 in a counterclockwise direction, as viewed from the left in Fig. 8, whereupon shaft 138 is rotated in a clockwise direction by the reduction gear train 139 (it being remembered that the reduction gear train 139 imparts an opposite direction of rotation to shaft 138 in respect to the direction of rotation of shaft 137). Clockwise rotation of shaft 138 allows actuator 154 to move toward the right whereupon spring fingers 155 move along balancing resistance 144 and member 148 toward the right hand extremities thereof. Spring fingers 155 continue to move in this direction until the resistances associated with solenoid windings 177 and 178 have been readjusted to such an extent that the voltage drops across solenoid windings 177 and 178 are again equal. When these voltage drops have been equalized in this manner, plunger 179 returns to its central position and contact 183 is moved out of engagement with contact 185. Separation of contacts 183 and 185 equalized the voltage drops across relay windings 186 and 187 and contact 191 moves out of engagement with contact 193 whereupon the circuit through field winding 133 is interrupted. The position of shaft 138 now corresponds to the new position of movable member 174.

If the temperature to which bimetallic element 175 continues to rise, the above described action will be repeated. If the temperature to which bimetallic element 175 should fall, the opposite action will take place, i. e., contact 182 will engage contact 184 which will result in engagement of contact 192 with contact 194 followed by energization of field winding 135 which will cause rotation of shaft 138 in a counterclockwise direction.

From the foregoing description of the operation of Fig. 8, it will be apparent that this operation is very similar to the operation of Fig. 4. Extreme movements of shaft 138 in either direction are prevented by limit switch contacts 162 and 163 or 158 and 159a. The resistance 147 and the member 150 may be used as a control potentiometer for another similar apparatus whereby a second shaft may be positioned in accordance with the position of movable member 174.

The movement of shaft 138 may be utilized to control any desired instrumentality such as the valve 38 in Fig. 1.

Where the work required of the reversible motors is relatively light, they may be replaced by motors having low voltage windings. In such a case, the relay comprising windings 186 and 187 may be omitted or the windings 186 and 187 may replace the motor field windings 133 and 135.

Turning now to Fig. 9, it will be noticed that the system therein shown includes the equivalent of the system shown in Fig. 8. Similar parts in Fig. 9 have been referenced to correspond with the like parts of Fig. 8.

Assuming that the shaft 138 controls a valve in the fuel line of a furnace and that bimetallic element 175 responds to the furnace temperature, the valve controlled by shaft 138 will be moved to positions corresponding to the temperature of bimetallic element 175 in the manner heretofore described for Figs. 4 and 8. With the parts in the position shown, the valve will be substantially half open and the furnace temperature is at the desired point. If the furnace is operating under a small load, the temperature thereof will rise with the result that bimetallic element 175 will move movable member 174 along control resistance 176 toward the left hand end thereof which action will partially close the valve controlled by shaft 138 until a balance is reached wherein the heat input maintains the furnace at an even temperature as described in connection with Fig. 8. This temperature, however, is somewhat higher than that desired as evidenced by movement of movable member 174 to the left of its center position. The furnace temperature can be maintained fairly close to the desired point by making the over-all length of control resistance 176 correspond to a relatively small temperature differential in the furnace. However, if the over-all length of control resistance 176 is made to correspond to a very small furnace temperature differential in an attempt to maintain the furnace temperature within very narrow limits, such as are sometimes required in commercial processes, there may be a resultant hunting of the valve controlled by the shaft 138 and the system may no longer modulate or proportion the position of the valve controlled by shaft 138. As a result, when it is desired to control the furnace temperature differential within very narrow limits under varying load conditions, it is necessary to provide additional mechanism whereby the position of the valve and shaft 138 may be adjusted automatically in accordance with the departure of the furnace temperature from normal and/or in accordance with the length of time that such a departure persists and/or upon initial reverse changes in furnace temperature. The additional mechanism shown in Fig. 9 makes this automatic adjustment possible.

Comparing Fig. 9 with Fig. 8, it will be noted that the fixed protective resistance 204 of Fig. 8 is not found in Fig. 9. However, a resistance 229 has one end thereof connected to wire 200 and solenoid winding 177 by a wire 230. A rotatable contact finger 231 which is fixed to a shaft 232 is connected to wires 206 and 207 by a wire 233. The contact finger 231 and resistance 229 constitute an adjustable resistance or rheostat which takes the place of the fixed protective resistance 204 of Fig. 8. Likewise, the fixed protective resistance 208 of Fig. 8 is replaced by a resistance 234, one end of which is connected to wires 211 and 212 by a wire 235. A rotatable contact finger 236 which is also carried by shaft 232 is adapted to sweep over resistance 234 upon rotation of shaft 232 and is connected to wire 202 and solenoid winding 178 by a wire 237. With the parts in the position shown in Fig. 9, the resistance of the circuit comprising wire 230, resistance 229, contact finger 231, and wire 233 is equal to the resistance of the circuit including wire 235, resistance 234, contact finger 236, and wire 237.

The wire 215 is connected to wire 213 through a manually adjustable rheostat comprising a resistance 238 and a manually operable contact finger 238a. The contact finger 238a and resistance 238 comprise a sensitivity control for balancing resistance 144 and its function will be hereinafter described.

The wire 213 is similarly connected to wire 214 through a rheostat comprising a resistance 239 and a manually adjustable contact finger 239a. This manually adjustable rheostat comprises a sensitivity control for control resistance 176 and its function will be referred to later in this description.

The shaft 232 carries a ratchet wheel 242 and a pinion 243. Pinion 243 meshes with an idler gear 244 which in turn meshes with a second pinion 245 mounted upon a shaft 246. Shaft 246 carries a second ratchet wheel 247. Line wires 248 and 249 constantly energize the field winding 250 of a timing motor generally indicated at 251, wires 252 and 253 connecting line wires 248 and 249 to the opposite ends of field winding 250. The rotor 254 of the timing motor 251 drives a reduction gearing herein shown as a worm 255 and a worm wheel 256. A crank pin 257 is carried by worm wheel 256 and the free end of crank pin 257 extends into a slot 258 which is formed in a lever 259, one end of which is pivoted as shown at 260. A vertical actuator 261 has one of its ends pivoted to the free end of the lever 259 as shown at 262. The actuator 261 is constantly reciprocated vertically by the timing motor 251 and associated mechanism and when the actuator 261 is positioned substantially vertically it reciprocates freely without engaging either of the ratchet wheels 242 and 247. If the lower free end of actuator 261 is moved to the left, it engages the teeth of ratchet wheel 242 upon upward movement so as to rotate shaft 232 and shaft 246 through pinions 243 and 245 and idler gear 244 in a counter-clockwise direction as viewed from the right in Fig. 9. Likewise, if the lower end of actuator 261 is moved to the right, it engages the teeth of ratchet wheel 247 during its upward movements and rotates shafts 246 and 232 in a clockwise direction.

The position of actuator 261 is controlled by a plunger 263 to which it is connected by a link 264 and spring 265. The plunger 263 is controlled by a pair of solenoid windings 266 and 267 which have adjacent ends interconnected and their free ends connected to the secondary 268 of a transformer by wires 269 and 270. The primary 271 of the transformer is constantly energized by line wires 248 and 249. A corrector potentiometer comprises a resistor 272 and a movable member 273. The movable member 273 is shown as connected to bimetallic element 175 by a connection 274. One end of corrector resistance 272 is connected to wire 269 and solenoid winding 266 through a protective resistance 275 by means of wires 276 and 277. The other end of corrector resistance 272 is connected to wire 270 and solenoid winding 267 through a protective resistance 278 by wires 279 and 280. Movable member 273 is connected by a wire 281 to a manually operable contact finger 282 which may be moved across a resistance 283, one end of which is connected to the junction of solenoid windings 266 and 267 by a wire 284. Contact finger 282 and resistance 283 comprise the sensitivity control for the corrective mechanism and its function will be described under "Operation".

The shaft 246 may control a corrector indicating potentiometer comprising a movable contact finger 285 and resistance 286 which control solenoid windings 287 and 288 that in turn position an indicating needle 289. The solenoid windings 287 and 288 and the corrector indicating potentiometer are connected together through suitable protective resistances and are also connected to the secondary 268 in the manner previously set forth in respect to similar arrangements.

The movable member 174 of Fig. 9 not only engages control resistance 176 but also extends therebelow and carries a pair of contacts 240 and 241 which are adapted, upon reverse movements of movable member 174, to respectively engage contacts 290 and 291. Contacts 290 and 291 are carried by a plate 292 which is herein shown, for convenience of illustration, as being pivoted at a point indicated at 292a. The pivotal mounting of plate 292 comprises any well known type of frictional arrangement whereby the plate 292 remains in any position to which it is moved. In actual practise, the plate 292 is pivoted concentrically with the center of movement of the movable member 174 in order that contacts 240, 241, 290 and 291 will retain their proper alignment.

A rheostat comprises a resistance 293 and a manually adjustable contact finger 293a. One end of resistance 293 is connected to wire 233 and the contact finger 293a is connected to contact 291 by a wire 294. A similar rheostat comprises a resistance 295 and manually adjustable contact finger 295a. The resistance 295 is connected to wire 235 and the contact finger 295a is connected to contact 290 by a wire 296.

*Operation of the system of Fig. 9*

With the parts in the position shown in Fig. 9, the valve controlled by shaft 138 is, for instance, in half-open position, the temperature of the furnace is at the desired point with the result that movable member 174 is contacting the central portion of control resistance 176, contacts 240 and 241 are out of engagement with contacts 290 and 291 respectively and the movable member 273 is contacting the center portion of corrector resistance 272. Field windings 133 and 135 are therefore both de-energized as heretofore explained in connection with Fig. 8 and the actuator 261 is in a vertical position wherein it is reciprocated by timing motor 251 without engaging either of the ratchet wheels 242 or 247.

If the temperature of the furnace should rise, bimetallic element 175 will move movable member 174 along control resistance 176 bringing contact 241 into engagement with contact 291. Engagement of contacts 241 and 291 places that part of resistance 293 which is between wire 233 and contact finger 293a in parallel with the left hand portion of control resistance 176, thereby decreasing the voltage drop across solenoid winding 177 a predetermined amount which is dependent upon the adjustment of contact finger 293a. The changed position of movable member 174 on control resistance 176 likewise lowers the voltage drop across solenoid winding 177. The voltage drop across solenoid winding 178 is increased and the resulting unequal energizations of solenoid windings 177 and 178 causes plunger 179 to move to the right with the result that field winding 133 is energized to rotate shaft 138 in a clockwise direction as viewed from the left in Fig. 9. Such rotation of shaft 138 begins to close the valve controlled thereby and begins to move spring fingers 155 to the right along balancing resistance 144 and member 148. Spring fingers 155 must not only move along balancing resistance 144 enough to balance the effect of the new position of movable member 174 on control resistance 172 but must also move an extra amount sufficient to overcome the unbalancing resulting from the engagement of contacts 241 and 291. In this manner, the initial movement of movable member 174 to the left resulted in an initial relatively large adjustment of the valve in addition to that adjustment resulting from the movement of the movable member to a new position on its control resistance.

This movement of bimetallic element 175 has also moved movable member 273 to the left along resistance 272 whereupon the voltage drop across solenoid winding 267 is made greater than the voltage drop across solenoid winding 266 and plunger 263 moves to the right. This action moves the lower free end of actuator 261 to the right and when actuator 261 is next raised by timing motor 251 and the associated mechanism, ratchet wheel 247 is moved in a clockwise direction as viewed from the right. Shaft 232 is therefore likewise rotated in a clockwise direction with the result that the resistance of the circuit comprising wire 230, resistance 229, contact finger 231, and wire 233 is decreased and the resistance of the circuit comprising wire 235, resistance 234, contact finger 236, and wire 237 is increased. This change in resistances of these circuits again unequalizes the voltage drops across solenoid windings 178 and 177 whereby solenoid winding 178 is again energized to a greater degree than solenoid winding 177. Plunger 179 therefore again moves to the right and results in a further energization of field winding 133 whereupon shaft 138 again rotates in clockwise direction as viewed from the left. This action closes the valve controlled by shaft 138 to a greater degree and likewise moves spring fingers 155 closer to the right hand end of balancing resistance 144 to again rebalance the voltage drops across solenoid windings 177 and 178 whereupon field winding 133 is again de-energized.

The shaft 232 will be intermittently rotated in a clockwise direction each time the actuator 261 is raised until the furnace temperature has returned to normal and movable member 273 is brought back to the position shown in Fig. 9. The angular rotation of shaft 232 each time actuator 261 is raised depends upon the amount of displacement of the lower free end of actuator 261 away from vertical and toward the right which in turn is dependent upon the deviation of the furnace temperature from normal as indicated by the position of movable member 273. The corrective movements of the valve toward closed position are therefore made in accordance with the departure of the furnace temperature from normal, and in accordance with the length of time such departure persists. The time factor is by virtue of the timing motor 251 which reciprocates actuator 261 preferably at the rate of a complete up and down movement every two minutes.

Continued rise in furnace temperature resulting in further movement of movable member 174 along control resistance 176 rotates plate 292 about its pivot 292a. Such further movement also again unbalances the voltage drops across solenoid windings 177 and 178 resulting in further closing of the valve. Continued rise in furnace temperature also moves movable member 273 further along corrector resistance 272 whereby the voltage drop across solenoid winding 267 is further increased and the voltage drop across solenoid winding 266 is further decreased. Plunger 263 therefore moves further towards the right and each subsequent upward movement of actuator 261 will rotate shaft 232 in a clockwise direction a larger amount than formerly, whereby increased amounts of correction will be applied to the system.

The various closing movements thus supplied to the valve will check the rise in furnace temperature but as long as the furnace temperature remains away from the normal desired value, further corrective movements will be applied. Finally the furnace temperature will begin to lower. Initial lowering of the furnace temperature will cause movable member 174 to disengage contact 241 from contact 291 thereby removing the resistance 293 from its parallel relationship with left-hand portion of the control resistance 176. The voltage drop across solenoid winding 177 will thereupon be increased and the voltage drop across solenoid coil 178 will be similarly decreased. As a result, field coil 135 will be energized to give the valve an initial opening movement. A slight further movement of control member 174 to the right in response to a further drop in furnace temperature will cause contact 240 to engage contact 290, whereby resistance 295 is placed in parallel with the right hand portion of control resistance 176 which again increases the voltage drop across solenoid winding 177 and decreases the voltage drop across solenoid winding 178, resulting in a further initial opening of the valve. In this manner, a small fall in furnace temperature results in an initial relatively large opening movement of the valve.

If the furnace temperature continues to fall until the desired normal is reached, the voltage drops across solenoid windings 266 and 267 will be rebalanced and the actuator 261 returned to its vertical position wherein it does not engage either of the ratchet wheels 242 or 247 and further corrective movements due to a departure from normal will no longer be applied.

The movement of control member 174 to the right along control resistance 176 also increases the voltage drop across solenoid winding 177 and decreases the voltage drop across solenoid winding 178 to open the valve an amount corresponding to the movement of the movable member 174.

If the furnace temperature falls below the desired normal, movable member 273 will be moved to the right of the center of corrector resistance 272 resulting in a greater voltage drop across solenoid winding 266 than across solenoid winding 267 and actuator 261 will be moved to the left of its vertical position. Actuator 261 will thereafter engage the teeth of ratchet wheel 242 upon each of its upward movements and shaft 232 will thereupon be rotated in a counter-clockwise direction, when looking from the right in Fig. 9 to intermittently increase the amount of resistance 229 and decrease the amount of resistance 234. Thus the valve is given intermittent opening movements in an effort to restore the furnace temperature to normal as long as it remains below normal.

Whenever the furnace temperature becomes normal so that movable member 174 again contacts the center of control resistance 176 and the movable member 273 contacts the center of corrector resistance 272, all further corrective movements of the valve will cease. However, the valve is not necessarily in its midposition since it may be displaced therefrom in either direction, depending upon the position which contact fingers 231 and 236 are left in respect to their respective resistances 229 and 234 and also depending on whether or not either of contacts 240 or 241 is in engagement with its respective contact 290 or 291. Such new position of the valve should exactly balance the new load condition imposed on the furnace.

From the foregoing description of the operation of the apparatus of Fig. 9, it will be apparent that this modification provides for the positioning of an instrumentality to be controlled in accordance with four different factors. First, the instrumentality is primarily positioned in accordance with the movements of a movable member. Second, the instrumentality is given a quick initial movement whenever the movement of the movable member reverses. Third, the instrumentality is positioned in accordance with the degree of departure of the movable member from its desired normal position. And fourth, the instrumentality is positioned in accordance with the length of time such departure persists.

As previously stated, in this specific embodiment of the invention, a speed of two minutes has been found suitable for a complete revolution of crank pin 257 but it will be appreciated that other speeds may be more desirable under varying conditions of operation and when the apparatus is applied to different processes.

In the description of the operation of Fig. 9, the various movements of the valve as the result of movement of the movable members 174 and 273 have been segregated and separately explained for reasons of clarifying the explanation, but in actual operation these movements will all overlap and occur simultaneously to a great extent.

The system of Fig. 9 includes several adjustments by reason of which the apparatus may be easily adapted to control any one of a number of different devices. If the contact finger 239a is rotated counter-clockwise to exclude more of the resistance 239 from the circuit, then a smaller movement of movable member 174 along control resistance 176 will be required to unbalance the voltage drops across solenoids 177 and 178 sufficiently to move one of the contacts 182 and 183 into engagement with its respective contact 184 or 185. In this manner, a smaller temperature change is necessary to obtain a given movement of the instrumentality to be controlled. Movement of contact finger 239a in a clockwise direction, on the other hand, decreases the sensitivity of the system. In a like manner, movement of contact finger 238a in a clockwise direction decreases the amount of resistance 238 in circuit with balancing resistance 144 with the result that the voltage drops across solenoid windings 177 and 178 are rebalanced upon a smaller movement of spring fingers 155 along balancing resistance 144. In this manner, a smaller movement of the instrumentality to be controlled will result upon a given movement of movable member 174. Likewise, larger movements of the instrumentality to be controlled will result for a given movement of movable member 174 if contact finger 238a is rotated along resistance 238 in a counterclockwise direction. By means of these two adjustments, the response of the system of Fig. 9 may be varied as desired or necessary in order to obtain the desired control. These two adjustments are equally applicable to the systems of Figs. 4 and 8 and to the remaining systems to be hereinafter described.

Rotation of contact finger 282 in a clockwise direction places more of resistance 283 in circuit with the corrector potentiometer and solenoids 260 and 267 with the result that the movement of plunger 263 will be decreased for a given movement of movable member 273. Counter-clockwise rotation of contact finger 282 will similarly decrease the amount of movement of movable member 273 required to move plunger 263 a given amount, adjustment of contact finger 282 therefore determines the amount that actuator 261 will be displaced from vertical upon a given deviation of the furnace temperature from normal with the result that the amount of corrective adjustment applied to the system in a predetermined time for a predetermined variation from normal may be varied as desired.

Adjustment of contact fingers 293a and 295a along their respective resistances 293 and 295 determines the amount of resistance placed in and out of circuit with the left and right hand portions of control resistance 176 upon making and breaking of contacts 241 and 291 and 240 and 290 respectively, whereby the magnitude of the initial adjustment given to the instrumentality to be controlled upon reverse movements of movable member 174 may be varied at will.

While the system of Fig. 9 has been specifically described as controlling the flow of fuel to a furnace which it is desired to maintain at a constant temperature under various load conditions, it will be appreciated that such a system has a great degree of utility in many other fields.

Fig. 10 shows a system which includes some modifications and additions over the system of Fig. 8 although the fundamentals of operation of the two systems are very similar. The solenoid windings 177 and 178 and mechanism controlled thereby, the relay windings 186 and 187 and mechanism controlled thereby, and the interconnecting circuits for these solenoid and relay windings are the same as in Fig. 8 and have been similarly referenced. Fig. 10 likewise includes the balancing resistance 144, member 148 and spring fingers 155 of Fig. 8.

One end of balancing resistance 144 is connected to the outer end of solenoid winding 177 through a protective resistance 300 by means of wires 301, 302, and 303. Similarly, the other end of balancing resistance 144 is connected to the outer end of solenoid winding 178 through a protective resistance 304 by means of wires 305, 306, and 307. The member 148 is connected to the junction of solenoid windings 177 and 178 by means of wires 308 and 309.

The junction of wires 302 and 303 is connected to a movable contact finger 310 by a wire 311. Contact finger 310 engages a resistance 312. The junction of wires 306 and 307 is connected to a movable contact finger 313 by a wire 314 and contact finger 313 engages a resistance 315. The junction of wires 308 and 309 is connected to a contact finger 316 by means of a wire 317 and contact finger 316 engages a resistance 318. Contact fingers 310, 313, and 316 are all simultaneously controlled by a rod 319 which is herein shown as operated by the bellows motor 320 of a fluid thermostat having a controlling element 321. The controlling element 321 may respond, for example, to outdoor temperatures. Upon a rise in outdoor temperature, the three contact fingers 310, 313, and 316 are rotated in a counter-clockwise direction and upon a fall in outdoor temperature, they are rotated in a clockwise direction.

The single control resistance 176 and the single movable member 174 of Fig. 8 are replaced by a plurality of resistances, which are interconnected in a manner to be hereinafter explained, and by a plurality of movable members. Movable members 322 and 322a are connected by a link 323 which is controlled by an actuator 324 that is herein shown as a thermostatic element. Movable member 322 engages a resistance 325 and movable member 322a engages a resistance 325a. Another set of movable members 326 and 326a are connected together by a link 327 which is controlled by thermostatic element 328 and these movable members engage resistances 329 and 329a. A third set of movable members 330 and 330a are connected together by a link 331 which is actuated by a thermostatic element 332. Movable members 330 and 330a respectively contact resistances 333 and 333a. A fourth set of movable members 334 and 334a are interconnected by a link 335 which is controlled by a thermostatic element 336 and these movable members respectively engage resistances 337 and 337a.

One end of resistance 312 is connected to movable member 322 by wires 338 and 339. One end of resistance 325 is connected to movable member 326 by a wire 340. One end of resistance 329 is connected to the middle of resistance 318 by wires 341, 342, and 343. It will therefore be seen that portions of resistances 325 and 329 are connected in series and are connected across solenoid winding 177 through resistance 312. The same end of resistance 312 is connected to movable member 330 by wires 338 and 344. One end of resistance 333 is connected to movable member 334 by a wire 345. One end of resistance 337 is connected to the mid-portion of resistance 318 by wires 346, 347, and 343. Resistances 333 and 337 are therefore similarly connected across solenoid winding 177 through resistance 312 and are in parallel with the series resistances 325 and 329. The series parallel arrangement of resistances 325, 329, 333, and 337 comprise an effective resistance which replaces the left hand portion of control resistance 176 of Fig. 8.

In a similar manner, one end of resistance 315 is connected to movable member 322a by wires 348 and 349. One end of resistance 325a is connected to movable member 326a by a wire 350. One end of resistance 329a is connected to the mid-portion of resistance 318 by wires 351, 342, and 343. One end of resistance 315 is also connected to movable member 330a by wires 348 and 352. One end of resistance 333a is connected to movable member 334a by a wire 353 and one end of resistance 337a is connected to the center portion of resistance 318 by wires 354, 347, and 343. The series resistances 322a—326a and 330a—334a are therefore connected in parallel across solenoid winding 178 through resistance 315 and replace the right hand portion of control resistance 176 of Fig. 8.

Neglecting resistances 312, 315, and 318 for the time being, the above described composite resistance comprising the various series parallel circuits have an effective resistance equal to the control resistance 176 of Fig. 8. Now if actuators 324, 328, 332, and 336 were all similar and responded to the same temperatures, the system of Fig. 10 would operate exactly the same as the system of Fig. 8. These four actuators, however, are made to respond to different temperatures, for example by placing them in different rooms of a house or building, with the result that the unbalancing of the voltage drops across solenoid windings 177 and 178 is dependent upon or influenced by the various temperatures to which each and every actuator responds whereby the position of plunger 179 is not controlled by any single actuator, but is controlled by the cooperation of all of the actuators. The number of actuators and movable members controlled thereby may be varied as desired and the interconnection of the various resistances contacted by the movable members may be arranged in any desired manner so that the voltage drops across solenoid windings 177 and 178 are controlled as the result of changes of temperature or any other condition or force as may be required in order to properly control any desired system or process.

If the temperature to which element 321 responds should rise, the amount of resistance 312 which is connected in circuit with the system is reduced and the amount of resistance 315 which is connected in circuit with the system is increased with the result that the voltage drops across solenoid windings 177 and 178, as determined by the positions of actuators 324, 328, 332, and 336, is modified. The shaft 138 may control a steam valve or a fuel supply valve by which the various rooms in the building or house are heated and therefore changes in the outdoor temperature to which element 321 responds will modify the position of such a valve as determined by the temperatures in the various rooms.

It will be noted that equal amounts of resistance 318 are placed in circuit with the junction of solenoid windings 177 and 178 and the member 148 upon movement of rod 319 in either direction and that the amount of resistance 318 thus put in circuit is proportionate to the movement of rod 319 from its normal position in which contact finger 316 engages the mid-portion of resistance 318. The resistance 318 might be termed an automatic adjustable protective resistance which functions to place varying amounts of protective resistance in the system whenever rod 319 is moved away from its normal position. This adjustable protective resistance is placed in circuit in the system in order to prevent full secondary voltage from being placed across either of the solenoid windings 177 and 178 as the result of movement of rod 319.

While the system of Fig. 10 has been described in conjunction with a heating system wherein the shaft 138 controls the supply of heat, the element 321 responds to outdoor temperature and the actuators 324, 328, 332, and 336 respond to temperatures in various rooms, it is to be understood that the various actuators may respond to conditions other than temperature and that the rod 319 may be positioned by temperatures other than outdoor temperature or by any other desired condition or force.

The system of Fig. 10 has been herein shown and described to illustrate the fact that the unbalancing of solenoid windings 177 and 178 may be accomplished by the cooperation of any number of resistances which may be controlled by various conditions or forces and that the rebalancing may be accomplished by a single balancing potentiometer which is operated by the same mechanism that positions an instrumentality in accordance with the various conditions or forces. With this fundamental thought in mind, there is no limit to the manner in which anyone skilled in the art may procure the unbalancing of solenoid windings 177 and 178 by incorporating the proper number of resistances, interconnecting them in the proper manner and adjusting them by the necessary conditions or forces to obtain any desired action of the apparatus.

Fig. 11 shows a system whereby the temperature of an electric furnace may be accurately maintained within predetermined limits by means of the present invention. The system of Fig. 11 has been found to have unusual value in thus controlling the temperature of an electric furnace.

Referring to Fig. 11, there is shown a control potentiometer comprising a control resistance 360 which is contacted by a movable member 361 herein shown as actuated by a bimetallic element 362. In actual commercial construction, the movable member 361 is operated by any of the well-known mechanisms controlled by a thermo-couple such as a Leeds and Northrup controller. This system also includes a pair of solenoid windings 363 and 364 which control a plunger 365 that is connected to a flexible switch arm 366 by means of a light spring 367. One end of control resistance 360 is connected to solenoid winding 363 through a protective resistance 368 by means of wires 369 and 370. The other end of control resistance 360 is connected to one end of solenoid winding 364 through a protective resistance 371 by means of wires 372 and 373. Line wires 374 and 375 supply power to the primary 376 of a step-down transformer having a low voltage secondary 377. Wire 370, and therefore one end of solenoid winding 363, is connected to one side of secondary 377 by means of wires 378 and 379. In like manner, wire 373 and therefore one end of solenoid winding 364, is connected to the other side of secondary 377 by means of wires 380 and 381.

Flexible switch arm 366 carries movable contacts 382 and 383 which are adapted to respectively engage stationary contacts 384 and 385. The system of Fig. 11 includes a balanced relay having windings 386 and 387 the junction of which is connected to flexible switch arm 366 through a protective resistance 388 by means of wires 389 and 390. The outer end of relay winding 386 is connected to stationary contact 385 by wires 391 and 392 and is connected to one side of secondary 377 by wires 391, 393, and 381. The outer end of relay winding 387 is connected to stationary contact 384 by wires 394 and 395 and is connected to the other side of secondary 377 by wires 394, 396, and 379.

Relay windings 386 and 387 control a plunger 397 which is connected to a relay switch arm 398 through a light spring 399. Relay switch arm 398 carries movable contacts 400 and 401 which are respectively cooperable with stationary contacts 402 and 403.

The system of Fig. 11 additionally includes first and second relays. The first relay comprises a relay coil 404 which controls an armature 405 to which are secured switch arms 406 and 407 that are adapted to respectively engage contacts 408 and 409 upon energization of relay coil 404. The second relay comprises a relay coil 410 which controls an armature 411 to which are secured switch arms 412 and 413 that are adapted to respectively engage contacts 414 and 415 upon energization of relay coil 410.

These first and second relays control a three-phase induction voltage regulator which comprises a three-phase motor 416 which operates a movable element or armature 417. The induction voltage regulator includes windings 418 and 419, the latter of which is positioned by movable element or armature 417 is well known to those skilled in the art.

The balancing potentiometer is comprised by a balancing resistance 420 and a balancing contact finger 421 which is actuated by a link 422 that is connected to movable element or armature 417 for reciprocation thereby. One end of balancing resistance 420 is connected to one end of resistance 360 and to wire 369 by a wire 423. The other end of balancing resistance 420 is connected to the other end of control resistance 360 and to wire 372 by a wire 424. Wires 425, 426, and 427 interconnect balancing contact finger 421, movable member 361, and the junction of solenoid windings 363 and 364.

The induction voltage regulator controls the voltage impressed upon an electric heating means, herein shown as a single electrical resistance 428, which heats the electric furnace, the temperature of which is controlled by the system of Fig. 11 due to the response of bimetallic element 362.

A three phase source of power is indicated at 429, 430, and 431. Line 429 is connected to the junction of 418 and 419 by a wire 432. The other end of winding 418 is connected to heating resistance 428 by a wire 433. The other end of heating resistance 428 is connected to the free end of winding 419 and to line 430 by wires 434, 435, and 436. The remaining circuit connections will be described under the heading "Operation".

The single phase voltage induction regulator shown in Fig. 11 and the single heater 428 have been shown for simplicity. In actual practice a three-phase voltage induction regulator and a three-phase heater would be used as will be appreciated by those skilled in the art.

*Operation of the system of Fig. 11*

With the parts in the position shown in Fig. 11 wherein movable member 361 is contacting the center of control resistance 360 and balancing contact finger 421 is contacting the center of balancing resistance 420, the voltage drops across solenoid windings 363 and 364 are equal. Contacts 382 and 383 are therefore out of engagement with contacts 384 and 385 with the result that relay windings 386 and 387 are equally energized and contacts 400 and 401 are out of engagement with contacts 402 and 403. This initial position of those parts and the reason for such position has been previously explained in connection with similar systems.

Relay coils 404 and 410 are both de-energized and heating resistance 429 is supplying just enough heat to maintain the furnace temperature at the desired point.

Now if the furnace temperature should rise, bimetallic element 362, in responding to such rise in furnace temperature, moves movable member 361 along control resistance 360 toward the left hand end thereof, thereby increasing the voltage drop across solenoid winding 364 and decreasing the voltage drop across solenoid winding 363, whereby plunger 365 moves to the right and causes contact 382 to engage contact 384. Engagement of contact 382 with contact 384 places protective resistance 388 in parallel with relay winding 387. The full current flow through protective resistance 388 and relay winding 387 now flows through relay winding 386 causing plunger 397 to be moved to the left with the result that contact 401 engages contact 403.

Relay coil 404 is thereby energized by a circuit which is as follows: line 374, wire 437, switch arm 398, contacts 401 and 403, wire 438, relay coil 404, wire 439, and wire 440 to line 375. Armature 405 is attracted and moves switch arms 406 and 407 into engagement with contacts 408 and 409. Two circuits are thus established to three phase motor 416. The first circuit is as follows: line 429, wire 441, motor 416, wire 442, wire 443, contact 408, switch arm 406, wire 444, and wire 445, to line 430. The second circuit is as follows: line 429, wire 441, motor 416, wire 446, wire 447, contact 409, switch arm 407, wire 448, and wire 449 to line 431. Motor 416 will now begin to rotate movable element or armature 417 in a counter-clockwise direction through suitable reduction gearing generally indicated at 450. Such movement of movable element 417 slowly moves winding 419 in respect to winding 418, as is well known to those skilled in the art, with the result that the voltage impressed across heating resistance 428 is reduced so as to reduce the amount of heat furnished by heating resistance 428. Link 422 will be moved to the right and carries with it balancing contact finger 421 which rebalances the voltage drops across solenoid windings 363 and 364 when balancing contact finger 421 has been moved to the proper position along balancing resistance 420.

Rebalancing of the voltage drops across solenoid windings 363 and 364 causes plunger 365 to move to the left until it reaches its normal central position. This movement of plunger 365 disengages contact 382 from contact 384 whereby the circuit through protective resistance 388 is interrupted. Interruption of the circuit through resistance 388 rebalances the voltage drops across and the current flows through relay windings 386 and 387 whereupon plunger 397 is moved to the right until its normal central position is reached. Contact 401 is thereby moved out of engagement with contact 403 to de-energize relay coil 404, whereupon armature 405 moves by gravity to the position in Fig. 11 thereby interrupting the two circuits to three-phase motor 316.

The parts will remain in their new positions until there is a further change in furnace temperature. If the furnace temperature should again rise, movable member 361 will be moved nearer to the left hand end of control resistance 360 and the above described sequence of operations will be repeated. When the furnace temperature falls, bimetallic element 362 moves movable member 361 along control resistance 360 toward the right hand end thereof. This action increases the voltage drop across solenoid winding 363 and decreases the voltage drop across solenoid winding 364 which results in movement of plunger 365 to the left. Contact 383 is thereby moved into engagement with contact 385 whereupon protective resistance 388 is placed in parallel with relay winding 386 and the current flow through protective resistance 388 and relay winding 386 all traverses relay winding 387. Plunger 397 is therefore moved to the right causing contact 400 to engage contact 402.

Engagement of contact 400 with contact 402 energizes relay coil 410 by a circuit which is as follows: line 374, wire 437, relay switch arm 398, contacts 400 and 402, wire 451, relay coil 410, wire 452, and wire 440 to line 375. Energization of relay coil 410 attracts armature 411 which in turn moves switch arms 412 and 413 respectively into engagement with contacts 414 and 415. Two energizing circuits are therefore established for three-phase motor 416 which circuits rotate said motor 416 in a direction opposite to that to which it was formerly rotated. The first of these circuits is as follows: line 429, wire 441, motor 416, wire 442, wire 453, contact 415, switch arm 413, wire 454, and wire 449 to line 431. The second new energizing circuit for motor 416 is as follows: line 429, wire 441, motor 416, wire 446, wire 455, contact 414, switch arm 412, wire 456, and wire 445 to line 430.

Movable element or armature 417 is therefore rotated in a clockwise direction and moves balancing contact finger 421 along balancing resistance 420 toward the left end thereof by means of link 422 and also moves winding 419 in respect to winding 418 in a direction to increase the voltage impressed across heating resistance 428. This action will continue until the amount of heat delivered by heating resistance 428 is sufficient to prevent further drop in furnace temperature and the furnace temperature levels off at some constant value. At this time balancing contact finger 421 will be in contact with that portion of balancing resistance 420 which rebalances the voltage drops across solenoid windings 363 and 364.

Plunger 365 is thereupon moved to its normal central position to interrupt the circuit through protective resistance 388 by separating contacts 383 and 385. The current flows through relay windings 386 and 387 are thereby equalized and plunger 397 returns to its normal central position to interrupt the circuit through relay coil 410 by separating contacts 400 and 402. armature 411 moves under the influence of gravity to the position shown in Fig. 11 and interrupts the two above described energizing circuits for three-phase motor 417.

In this manner, the heating effect of heating resistance 428 is decreased or increased as the furnace temperature rises above or falls below normal and this decrease or increase in the heating effect of heating resistance 428 is proportional to the departure of the furnace temperature from the desired normal. This is accomplished by automatically operating the movable element of a three-phase induction voltage regulator. The temperature range within which the temperature is thus allowed to fluctuate may be predetermined, within reasonable limits, by so adjusting or constructing the furnace temperature responsive mechanism that the movable member 361 moves from one end of control resistance 360 to the other end thereof when the furnace temperature changes from one of its predetermined limits to the other of its predetermined limits.

Any or all of the corrective devices shown in Fig. 9 can be applied to the system of Fig. 11 if such connections are deemed desirable or found necessary.

Fig. 12 shows a modification of the invention in which a heat motor is used. Heat motors are well-known in the art and are moved in one direction upon heating of the thermostatic element, generally by an electrical heating element, and move in the opposite direction upon cooling of the thermostatic element, generally obtained by operatively de-energizing an electrical heating element.

Referring to Fig. 12 of the drawings, the system shown therein includes a control potentiometer comprising a control resistance 460, a movable member 461, and an actuator 462, which controls the movable member 461 and is again shown as a bimetallic thermostatic element. The system likewise includes a solenoid winding 463 having one of its ends connected to one end of a similar solenoid winding 464. The other end of solenoid winding 463 is connected to one end of control resistance 460 through a protective resistance 465. In like manner, the other end of solenoid winding 464 is connected to the other end of control resistance 460 through a protective resistance 466.

A plunger 467 is controlled by solenoid windings 463 and 464 and in turn controls a flexible switch arm 468 through a light spring 469. Flexible switch arm 468 carries a single contact 470 which cooperates with a stationary contact 471.

The heat motor comprises a bellows 472 and a thermostatic element in the form of a capsule 473 which is connected to bellows 472 by a capillary tube 474. The bellows tube and capsule are charged with a suitable amount of fluid so as to give the desired type of operation. An electrical heating element 475 is provided for heating capsule 473 and its contents. Bellows 472 actuates a power delivery element 476 which may control any desired instrumentality such as a valve which may control the amount of heat to which bimetallic element 462 responds.

A balancing potentiometer comprises balancing resistance 477 and a balancing contact finger 478 which is controlled by a link 479 that is operatively connected to power delivery element 476. Balancing contact finger 478, movable member 461, and the junction of solenoid windings 463 and 464 are interconnected by wires 480, 481, and 482. One end of balancing resistance 477 is connected to one end of control resistance 460 by a wire 483 and the other ends of the balancing and control resistances are connected by a wire 484. A source of supply is indicated by line wires 485 and 486 which supply power to the primary 487 of a stepdown transformer having a low voltage secondary 488. One side of secondary 488 is connected to one end of electrical heating element 475 and to the outer end of solenoid winding 463 by wires 489, 490, and 491. The other side of secondary 488 is connected to contact 471 and to the outer end of solenoid winding 464 by wires 492, 493, and 494. The other end of electrical heating element 475 is connected to flexible switch arm 468 by a wire 495.

*Operation of the system of Fig. 12*

With the parts in the position shown in Fig. 12, contact 470 has just separated from contact 471 thereby interrupting the circuit to elecrical heating element 475 which was as follows: secondary 488, wire 492, wire 493, contact 471, contact 470, switch arm 468, wire 495, electrical heating element 475, wire 490, and wire 489 to the other side of secondary 488. De-energization of electrical heating element 475 allows capsule 473 and its contents to cool, whereupon bellows 472 contracts moving power delivery element 476 and balancing contact finger 478 to the right. A very slight movement of these parts in the direction indicated results in decreasing the voltage drop across solenoid winding 464 and increasing the voltage drop across solenoid winding 463. Plunger 467 moves to the left and engages contact 470 with contact 471 to re-establish the above described energizing circuit for electrical heating element 475.

Capsule 473 and its contents are thereupon heated and bellows 472 expands moving power delivery element 476 and balancing contact finger 478 to the left. This movement of balancing contact finger 478 balances the voltage drops across solenoid windings 463 and 464. Plunger 467 moves to the right and separates contacts 470 and 471 to again interrupt the energizing circuit for heating element 475.

As long as movable member 461 remains in the same position, this intermittent energization and de-energization of electrical heating element 475 and the resulting slight oscillatory movement of power delivery element 476 and balancing contact finger 478 will continue. In this manner, the heat motor which is a single circuit mechanism will maintain itself in substantially the same position as long as the temperature to which bimetallic element 462 responds remains unchanged. In the previous figures where reversible motors were used (two-circuit devices), the reversible motors of course maintained themselves in any position to which they were moved until one or the other of the energizing circuits were again energized.

If the temperature to which bimetallic element 462 responds now rises, movable member 461 will move along control resistance 460 toward the left end thereof, and the voltage drop across solenoid winding 464 will be increased and the voltage drop across solenoid winding 463 will be decreased and plunger 467 will be proportionately displaced to the right thereby separating contact 470 from contact 471 a considerable amount. Capsule 473 and its contents must now cool considerably before balancing contact finger 478 moves far enough along balancing resistance 477, toward the right end thereof, to rebalance the voltage drops across solenoid windings 463 and 464 to again close contacts 470 and 471. As a result, power delivery element 476 is moved to the right a considerable amount and the heat to bimetallic element 462 is decreased in proportion.

As long as movable member 461 remains in its new position, the circuit to heating element 475 will again be intermittently completed and interrupted with a frequency such that the average temperature delivered to capsule 473 and its contents will be just sufficient to maintain the heat motor in its new position.

If the temeprature to which bimetallic element 462 responds should become lower, movable member 461 will move to the right with the result that solenoid windings 463 and 464 are unbalanced in such a manner as to move contact 470 firmly into engagement with contact 471. Electrical heating element 475 will therefore remain energized sufficiently long to move balancing contact finger 478 far enough along balancing resistance 477, toward the left end thereof, until the solenoid windings 463 and 464 are again rebalanced after which the intermittent energization and de-energization of electrical heating element 475 will again take place in order to maintain the power delivery element 476 in its new position.

In this manner, the power delivery element 476 is maintained in a substantially constant position as long as movable member 461 remains stationary, and is moved to new substantially constant positions whenever movable member 461 moves to a new position.

In the foregoing description of Figs. 4, 8, 9, 10, 11 and 12, the movements of the various members, elements, and devices have been segregated into steps in an attempt to describe the manners in which the various systems operate. It will be understood that in actual operation, these various movements all overlap and are all taking place at substantially the same time with the result that movements of the movable members of the various systems are closely and continuously followed by corresponding movements of the instrumentalities to be controlled. In other words, the systems herein described are the type which are continuously operating but it has been necessary to describe the various steps of such operations in order to set out the manner in which the various systems function.

While no particular relationship is necessary between the impedance of the control resistance, the impedance of the balancing resistance or the impedance of the normally balanced electrical means or balanced solenoids, best results have been obtained when the composite impedance of the single control resistance or the multiple control resistances and the single balancing resistance including the protective resistances is substantially equal to the impedance of the normally balanced solenoids.

From the foregoing description of the various figures of the drawings, it will be seen that the present invention provides an exceedingly flexible system which may be slightly modified and rearranged to give almost any desired control or indication and particularly where it is desired to move one or more control or instrumentalities in accordance with the movement of one or more movable members which may respond to any condition or force or inter-action or combination of such conditions or forces. Therefore, although several specific embodiments of the invention have been herein described, it is to be understood that these embodiments are capable of many changes and that the invention, in its broader aspects, is capable of a great many other applications to specific problems and I am therefore to be limited only in the purview of the appended claims.

I claim as my invention:

1. In combination, cooperating electrically controlled means, circuit connections for normally equally energizing said means, a pair of stationary contacts, movable contact means engageable with said stationary contacts and controlled by said electrically controlled means, control resistance means electrically associated with the electrically controlled means, a movable member for operating said control resistance means to unequally energize the electrically controlled means whereby the movable contact means is moved into engagement with one of said stationary contacts, electrical connections completed by the engagement of said movable contact means with said one of the stationary contacts for further unequally energizing the electrically controlled means, a reversible motor, energizing circuits therefor controlled by said stationary contacts and the movable contact means, balancing resistance means electrically associated with the electrically controlled means and operated by the reversible motor, when energized, to again equalize the energization of said electrically controlled means whereby the movable contact means is moved out of engagement with said one of the stationary contacts, and an instrumentality positioned by the reversible motor.

2. In a system of the class described, in combination, a source of alternating current, a pair of electromagnetic coils connected in series, a control potentiometer and a balancing potentiometer, each including a resistance and a co-operating contact, connections connecting each of said resistances and said series-connected coils all in parallel across said source of power, connections connecting both of said contacts to the junction of said coils, switching means controlled by said coils and arranged to be in open circuit position when both of said coils are substantially equally energized, means to change the respective positions of the resistance and contact of the control potentiometer whereby to unbalance the energizations of said coils and close said switching means, motor means controlled by said switching means, a device to be positioned controlled by said motor means, and connections between said motor means and balancing potentiometer by which the motor means varies the respective positions of the balancing resistance and balancing contact to substantially rebalance the energizations of said coils and open said switching means.

3. In an electrical follow-up system, in combination, a pair of series-connected electromagnetic coils, an armature controlled by the co-operative action of said electromagnetic coils, switching means controlled by said armature, motor means controlled by said switching means, a potentiometer including a resistance and a co-operating contact controlled by said motor means, control resistance means, a source of power, connections connecting said series-connected electromagnetic coils across said source of power and connecting said resistance of the potentiometer across said source of power, connections associating said control resistance means with said electromagnetic coils for varying the respective energizations thereof, a connection between the contact of the potentiometer and the junction of said series-connected electromagnetic coils, resistance means connected in series with each end of the resistance of the potentiometer, and a member to be positioned controlled by said motor means.

4. In an electrical remote control system, in combination, a device to be positioned, motor means in control thereof, a pair of co-operating contacts in control of said motor means, electrical means in control of said contacts, a control member, means associated with the control member and electrical means for energizing at least a portion of the latter to close said contacts upon movement of said control member, a circuit controlled by said contacts for energizing a portion of said electrical means to increase the pressure between said contacts, and means controlled by said motor means to again open said contacts.

5. A system of the class described, comprising, in combination, a member to be controlled, a motor means in control thereof, normally open switching means in control of said motor means, oppositely acting electromagnetic means which are normally equally energized in control of said switching means, control resistance means associated with said oppositely acting electromagnetic means operative to unbalance the energizations thereof and cause closure of said switching means, circuit connections controlled by said switching means operative to increase the unbalance in the energizations of said oppositely acting electromagnetic means to increase the closing pressure on said switching means, and balancing resistance means operated by said motor means associated with said oppositely acting electromagnetic means for rebalancing the energizations thereof.

6. In combination, a pair of oppositely acting normally equally energized electromagnetic coils, a single armature controlled thereby, a switch controlled by said armature and moved to closed position upon unequal energization of said electromagnetic coils, control means associated with said electromagnetic coils operative to unbalance the energizations thereof whereby to cause closure of said switch, motor means controlled by said switch, a device to be controlled by said motor, and connections controlled by said switch operative to increase the unbalance in the energizations of said electromagnetic coils whereby to increase the closing contact pressure of said switch.

7. In combination, a pair of oppositely acting normally equally energized electromagnetic coils, a single armature controlled thereby, a switch controlled by said armature and moved to closed position upon unequal energization of said electromagnetic coils, control means associated with said electromagnetic coils operative to unbalance the energizations thereof, whereby to cause closure of said switch, motor means controlled by said switch, a device to be controlled by said motor, and connections controlled by said switch operative to complete a circuit through a portion of one of said electromagnetic coils to increase the unbalance in their energizations whereby to increase the closing pressure of said switch.

8. In a system of the class described, in combination, first and second series connected windings connected across a source of power whereby they are normally equally energized, a double circuit switching mechanism comprising a switch arm and a pair of spaced co-operating contacts, a connection between said switch arm and the junction of said windings, first and second oppositely acting normally equally energized electromagnetic means in control of said switching means and operative selectively to move said switch arm into engagement with said first or second contact upon energization of one of said electromagnetic means more highly than the other, control means operative to energize at least a portion of said first electromagnetic means more highly than said second electromagnetic means to move said switch arm into engagement with said first contact or to energize at least a portion of said second electromagnetic means more highly than the first electromagnetic means to move said switch arm into engagement with said second contact, connections including one between said first contact, at least a portion of said first electromagnetic means and an end of the first winding to place said last-named portion of the first electromagnetic means in parallel with said first winding upon engagement of said switch arm and first contact thereby decreasing the current flow through the first winding and increasing the contact pressure between said switch arm and first contact, connections including one between said second contact, at least a portion of said second electromagnetic means and one side of said second winding to place said last-named portion of the second electromagnetic means in parallel with the second winding upon engagement of said switch arm and second contact whereby the current flow through said second winding is decreased and the pressure between said switch arm and second contact is increased, and a device to be operated controlled by said windings.

9. In a system of the class described, in combination, first and second series connected windings connected across a source of power whereby they are normally equally energized, a double circuit switching mechanism comprising a switch arm and a pair of spaced co-operating contacts, a connection between said switch arm and the junction of said windings, first and second oppositely acting normally equally energized electromagnetic means in control of said switching means and operative selectively to move said switch arm into engagement with said first or second contact upon energization of one of said electromagnetic means more highly than the other, control means operative to energize at least a portion of said first electromagnetic means more highly than said second electromagnetic means to move said switch arm into engagement with said first contact or to energize at least a portion of said second electromagnetic means more highly than the first electromagnetic means to move said switch arm into engagement with said second contact, connections including one between first contact, at least a portion of said first electromagnetic means and an end of the first winding to place said last-named portion of the first electromagnetic means in parallel with said first winding upon engagement of said switch arm and first contact thereby decreasing the current flow through the first winding and increasing the contact pressure between said switch arm and first contact, connections including one between said second contact, at least a portion of said second electromagnetic means and one side of said second winding to place said last-named portion of the second electromagnetic means in parallel with the second winding upon engagement of said switch arm and second contact whereby the current flow through said second winding is decreased and the pressure between said switch arm and second contact is increased, and a device to be positioned and means to balance the energizations of said electromagnetic means both controlled by said windings.

10. In a system of the class described, in combination, first and second series connected windings connected across a source of power whereby they are normally equally energized, a double circuit switching mechanism comprising a switch arm and a pair of spaced co-operating contacts, a connection between said switch arm and the junction of said windings, first and second oppositely acting normally equally energized electromagnetic means in control of said switching means and operative selectively to move said switch arm into engagement with said first or second contact upon energization of one of said electromagnetic means more highly than the other, control means operative to energize at least a portion of said first electromagnetic means more highly than said second electromagnetic means to move said switch arm into engagement with said first contact or to energize at least a portion of said second electromagnetic means more highly than the first electromagnetic means to move said switch arm into engagement with said second contact, connections including one between said first contact, at least a portion of said first electromagnetic means and an end of the first winding to place said last-named portion of the first electromagnetic means in parallel with said first winding, upon engagement of said switch arm and first contact thereby decreasing the current flow through the first winding and increasing the contact pressure between said switch arm and first contact, connections including one between said second contact, at least a portion of said second electromagnetic means and one side of said second winding to place said last-named portion of the second electromagnetic means in parallel with the second winding upon engagement of said switch arm and second contact whereby the current flow through said second winding is decreased and the pressure between said switch arm and second contact is increased, a double circuit switching mechanism controlled by said windings, reversible electric motor means controlled by said switching mechanism, and a device to be positioned and means to balance the energizations of said electromagnetic means both controlled by said electric motor means.

11. In an electrical remote control system, in combination, a pair of normally balanced oppositely acting series-connected electromagnetic coils, a control potentiometer including a control resistance and an associated control contact, a balancing potentiometer including a balancing resistance and an associated balancing contact, a source of power, electrical connections connecting said control resistance, said balancing resistance and said series-connected coils, all in parallel across said source of power and connecting said control and balancing contacts between said coils whereby the relative energizations of said coils is controlled by the conjoint action of said control and balancing potentiometers, switching means controlled by the conjoint action of said coils, motor means controlled by said switching means, a device to be positioned, connections between said motor means, a device to be positioned and balancing potentiometer, and connections controlled by said switching means to additionally energize at least a portion of one of said coils.

12. In an electrical remote control system, in combination, a pair of normally balanced oppositely acting electromagnetic coils, a control potentiometer including a control resistance and an associated control contact, a balancing potentiometer including a balancing resistance and an associated balancing contact, a source of power, electrical connections connecting said control resistance, said balancing resistance and said coils, in series, all in parallel across said source of power and connecting said control and balancing contacts between said coils whereby the relative energizations of said coils is controlled by the conjoint action of said control and balancing potentiometers, switching means controlled by the conjoint action of said coils, motor means controlled by said switching means, a device to be positioned, connections between said motor means, device to be positioned and balancing potentiometer, connections controlled by said switching means to additionally energize at least a portion of one of said coils, and fixed resistance means associated with said coils to prevent complete short-circuiting thereof irrespective of the positions of said control and balancing potentiometers.

13. In combination, a device to be positioned, motor means in control thereof, switching means in control of the motor means, a pair of series connected electromagnetic coils to control said switching means, a variable control reactance associated with said coils to cause operation of said switching means in a manner to operate said motor means, a variable balancing reactance operated by said motor means and associated with said coils to cause operation of said switching means in a manner to render said motor means inoperative, a second device to be positioned, a second motor means in control thereof, second switching means in control of said second motor means, a variable reactance in control of said second switching means and controlled by said first motor means, and a second balancing reactance means associated with said second switching means and controlled by said second motor means.

14. In an electrical remote control system, in combination, a device to be positioned, motor means in control thereof, first cooperating contact means in circuit with said motor means, a first pair of coils connected in series across a source of power in control of said first contact means, a second contact means in control of the respective energizations of said first pair of coils, electrical means in control of said second contact means, a control member, means associated with the control member and electrical means for energizing at least a portion of the latter to close said second contact means upon movement of said control member, a circuit controlled by said second contact means for placing a portion of said electrical means in parallel with one or the other of said electrical coils whereby to increase the pressure between said second contact means and to change the relative energiaztions of said coils to cause actuation of said first contact means, and means controlled by said motor means to again open said second contact means.

LEWIS L. CUNNINGHAM.